United States Patent
Suzuki

(10) Patent No.: US 9,831,815 B2
(45) Date of Patent: Nov. 28, 2017

(54) DRIVE CONTROL DEVICE USING PWM CONTROL OF SYNCHRONOUS RECTIFICATION TYPE

(71) Applicant: RISO KAGAKU CORPORATION, Tokyo (JP)

(72) Inventor: Masao Suzuki, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/171,303

(22) Filed: Jun. 2, 2016

(65) Prior Publication Data

US 2016/0373046 A1 Dec. 22, 2016

(30) Foreign Application Priority Data

Jun. 19, 2015 (JP) ................. 2015-123604

(51) Int. Cl.
| | |
|---|---|
| H02P 1/46 | (2006.01) |
| H02P 27/08 | (2006.01) |
| H02P 3/22 | (2006.01) |
| H02P 3/12 | (2006.01) |
| H02P 7/29 | (2016.01) |
| H02P 7/03 | (2016.01) |

(52) U.S. Cl.
CPC ............. H02P 27/08 (2013.01); H02P 3/12 (2013.01); H02P 3/22 (2013.01); H02P 7/04 (2016.02); H02P 7/29 (2013.01)

(58) Field of Classification Search
CPC .......... H02P 27/08; H02P 7/29; H02M 7/5395
See application file for complete search history.

(56) References Cited

U.S. PATENT DOCUMENTS

| 4,558,265 A | 12/1985 | Hayashida et al. |
|---|---|---|
| 6,407,520 B1 | 6/2002 | Kleefeldt et al. |
| 2013/0154532 A1 | 6/2013 | Otte et al. |
| 2014/0239854 A1 | 8/2014 | Suzuki |
| 2016/0365819 A1* | 12/2016 | Masuda ............... H02P 6/08 |

FOREIGN PATENT DOCUMENTS

JP 2014-165982 9/2014

OTHER PUBLICATIONS

Extended European Search Report for EP 16173678.0 dated Dec. 6, 2016.

* cited by examiner

*Primary Examiner* — Karen Masih
(74) *Attorney, Agent, or Firm* — Greenblum & Bernstein, P.L.C.

(57) ABSTRACT

A drive control device includes: a driver including a circuit and configured to drive a motor; and a controller configured to control the driver. The controller is configured to: in a period other than a stop period during driving of the motor, control the driver by a PWM control of a synchronous rectification type, the stop period lasting for a specified time or longer during the driving of the motor; and in the stop period during the driving of the motor, suspend the PWM control of the synchronous rectification type and control the driver such that the motor is set to a short-circuit brake state or a disconnected state.

7 Claims, 26 Drawing Sheets

| PWM FREQUENCY [kHz] | AVERAGE CURRENT OF MOTOR [mA] | EFFECTIVE CURRENT OF MOTOR [mA] | RIPPLE AMOUNT [mA] |
|---|---|---|---|
| 20 | 0.53 | 174 | 594 |
| 25 | 0.19 | 139 | 477 |
| 30 | −0.09 | 116 | 398 |
| 35 | −0.32 | 99 | 342 |
| 40 | −0.54 | 87 | 299 |

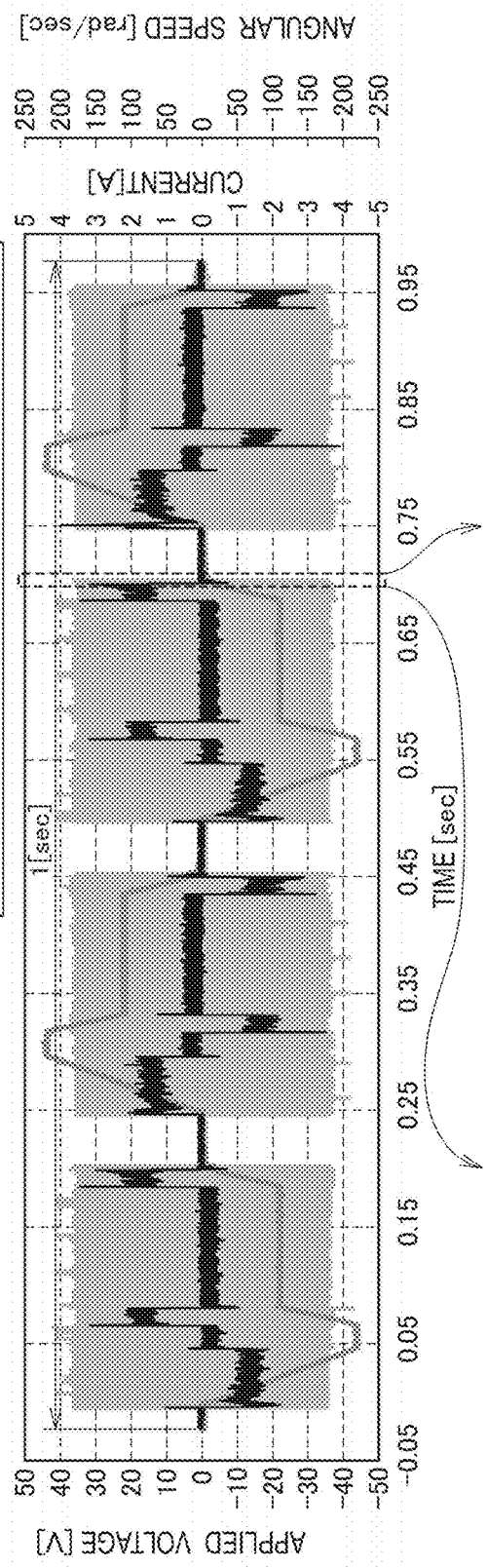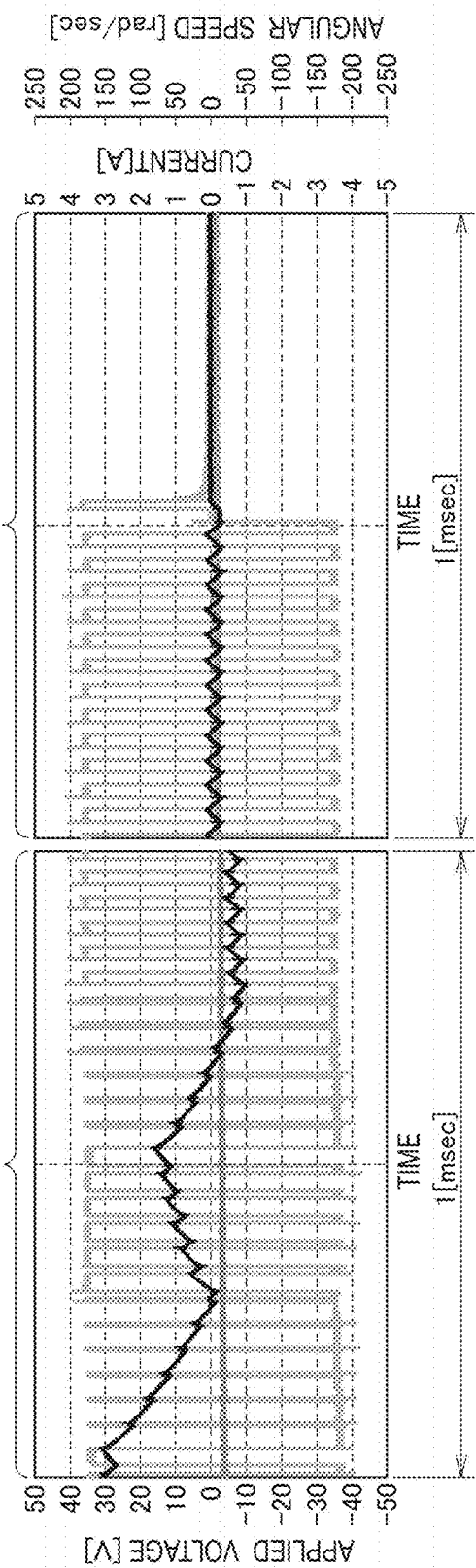
FIG. 17

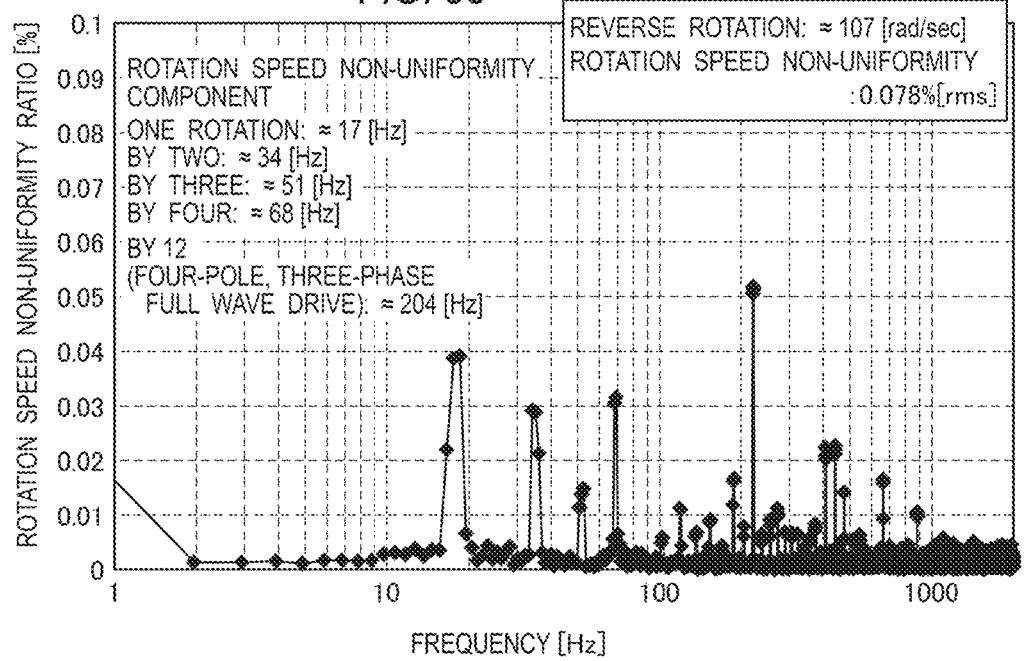
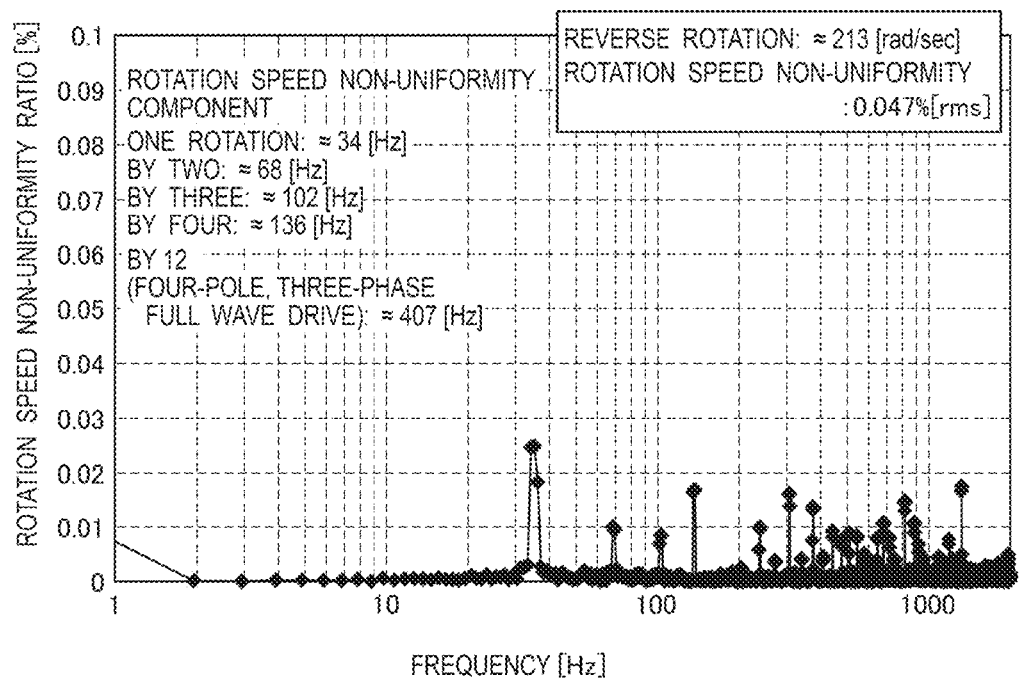

_(1)_
DRIVE CONTROL DEVICE USING PWM CONTROL OF SYNCHRONOUS RECTIFICATION TYPE

CROSS REFERENCE TO RELATED APPLICATION

This application is based upon and claims the benefit of priority from the prior Japanese Patent Application No. 2015-123604, filed on Jun. 19, 2015, the entire contents of which are incorporated herein by reference.

BACKGROUND

1. Technical Field

The disclosure relates to a drive control device configured to drive a motor.

2. Related Art

Japanese Unexamined Patent Application Publication No. 2014-165982 proposes a drive control device configured to drive a motor by performing pulse width modulation (PWM) control.

A synchronous rectification type is known as one of the PWM control methods. The synchronous rectification type is a method in which a direction of a voltage applied to the motor is switched over in synchronization with switching between an L (low) period and an H (high) period of a PWM signal.

SUMMARY

In the PWM control of the synchronous rectification type, the sign (negative or positive) of an average value of a current flowing in the motor is reversed across a point where a duty ratio of the PWM signal is 50%, and the rotation direction of the motor is also similarly reversed. When the duty ratio of the PWM signal is 50%, an average value of a current flowing in the motor is zero and the motor is set to a stop state.

When the duty ratio of the PWM signal, is 50%, although the average value of the current flowing in the motor is zero, the current is integrated by inductance of the motor to cause a flow of ripple current with a triangle waveform. Accordingly, if the duty ratio of the PWM signal is set to 50% in order to set the motor to the stop state, the motor is stopped, but a power loss and a temperature increase of the motor occur due to the ripple current.

An object of the disclosure is to provide a drive control device which can suppress a power loss and a temperature increase of a motor.

A drive control device in accordance with some embodiments includes: a driver including a circuit and configured to drive a motor; and a controller configured to control the driver. The controller is configured to: in a period other than a stop period during driving of the motor, control the driver by a PWM control of a synchronous rectification type, the stop period lasting for a specified time or longer during the driving of the motor; and in the stop period during the driving of the motor, suspend the PWM control of the synchronous rectification type and control the driver such that the motor is set to a short-circuit brake state or a disconnected state.

In the configuration described above, in the stop period lasting for the specified time or longer during the driving of the motor, the controller controls the driver such that the PWM control of the synchronous rectification type is stopped and the motor is set to the short-circuit brake state or the disconnected state. This can suppress a ripple current from flowing in a stop period of the motor. As a result, a power loss and a temperature increase of the motor 6 can be suppressed.

BRIEF DESCRIPTION OF DRAWINGS

FIG. 17 includes a waveform diagram of measured data of the applied voltage, the current, and the angular speed of the motor in the drive pattern A, and enlarged views of waveforms at the time when the motor transitions from a reverse rotation state to the stop period lasting for the specified time or longer.

FIG. 33 is a graph illustrating a result obtained by performing the FFT analysis on the rotation speed non-uniformity ratio of FIG. 29.

FIG. 34 is a graph illustrating a result obtained by performing the FFT analysis on the rotation speed non-uniformity ratio of FIG. 30.

DETAILED DESCRIPTION

Figure 1:
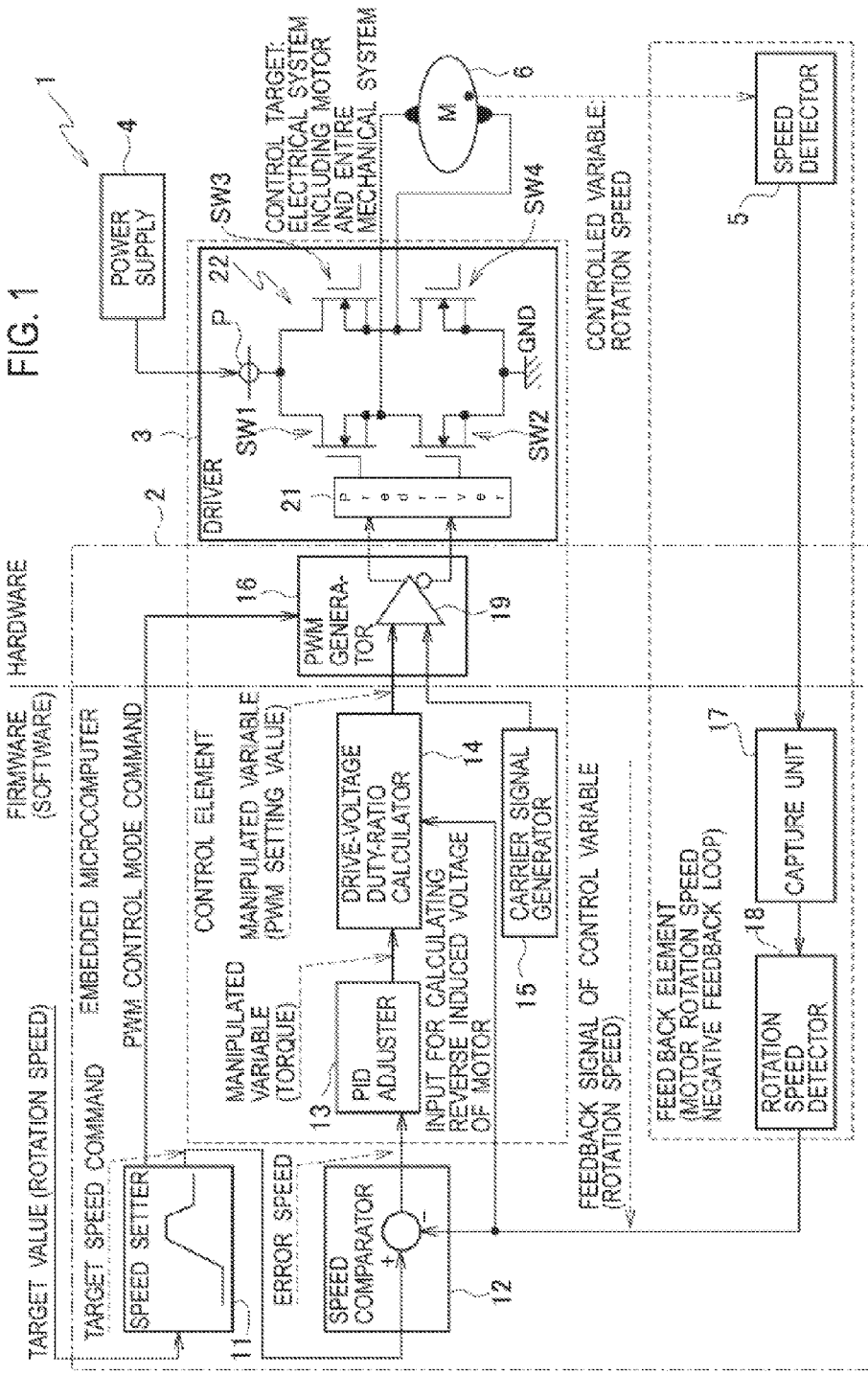
FIG. 1 is a schematic configuration diagram of a drive control device in an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

FIG. 1 is a schematic configuration diagram of a drive control device 1 according to an embodiment of the present invention. As illustrated in FIG. 1, the drive control device 1 includes an embedded microcomputer 2 (controller), a driver 3, a power supply 4, and a speed detector 5. The drive control device 1 is a device for driving a motor 6 which is a DC motor.

The embedded microcomputer 2 controls the driver 3 by PWM control of a synchronous rectification type. The embedded microcomputer 2 outputs a PWM signal to the driver 3. The embedded microcomputer 2 includes a device-embedded digital signal processor (DSP), a central processing unit (CPU), and a storage formed of a semiconductor memory and the like. The storage stores instructions that, when executed by a processor of the DSP or the CPU, cause the processor to perform operations explained below. The storage may be provided outside the embedded microcomputer 2. The embedded microcomputer 2 includes a speed setter 11, a speed comparator 12, a PID adjuster 13, a drive-voltage duty-ratio calculator 14, a carrier signal generator 15, a PWM generator 16, a capture unit 17, and a rotation speed detector 18.

The speed setter 11, the speed comparator 12, the PID adjuster 13, the drive-voltage duty-ratio calculator 14, the carrier signal generator 15, the capture unit 17, and the rotation speed detector 18 are implemented by firmware (software) in the embedded microcomputer 2. The PWM generator 16 is a unit built in the embedded micro computer 2 as hardware.

The speed setter 11 outputs a target speed command indicating a target value of a rotation speed of the motor 6 to the speed comparator 12. The target value is inputted into the speed setter 11 from the outside.

Moreover, the speed setter 11 outputs a PWM control mode command to the PWM generator 16. The PWM control mode command is a command for performing switching between a normal mode and a temporary stop mode. The normal mode is a mode in which the PWM control of the synchronous rectification type is performed. The temporary stop mode is a mode in which the PWM control of the synchronous rectification type is suspended to generate no voltage applied to the motor 6 in a stop period lasting for a specified time or longer during driving of the motor. Specifically, the temporary stop mode is a mode in which the motor 6 is set to a short-circuit brake state or a disconnected state (electrically free state) in the stop period lasting for the specified time or longer during the driving of the motor.

The speed comparator 12 compares the rotation speed of the motor 6 and the target value and calculates an error speed which is the difference therebetween. The rotation speed of the motor 6 is inputted from the rotation speed detector 18 into the speed comparator 12.

The PID adjuster 13 calculates a torque required in the motor 6 to set the rotation speed of the motor 6 to the target value, based on the error speed by means of PID calculation.

The drive-voltage duty-ratio calculator 14 calculates a drive voltage of the motor 6 in the synchronous rectification type, based on the torque calculated by the PID adjuster 13, the rotation speed of the motor 6, and the electrical specification of the motor 6. Moreover, the drive-voltage duty-ratio calculator 14 sets a duty ratio of a PWM signal in the synchronous rectification type, based on the calculated drive voltage. Furthermore, the drive-voltage duty-ratio calculator 14 calculates a PWM setting value corresponding to the calculated drive voltage and outputs the PWM setting value to a comparator 19 of the PWM generator 16 to be described later.

The carrier signal generator 15 generates a saw-tooth wave or triangle wave carrier signal of a predetermined cycle and outputs the carrier signal to the PWM generator 16.

In the normal mode, the PWM generator 16 generates a rectangle wave PWM signal and outputs the PWM signal to the driver 3. The PWM generator 16 has the comparator 19. The comparator 19 generates a PWM signal with the set duty ratio in the normal mode by comparing the carrier signal and the PWM setting value. The comparator 19 outputs the PWM signal with the set duty ratio to a switch element SW1 of the driver 3 to be described later, and outputs a PWM signal with the opposite phase to the PWM signal outputted to the switch element SW1, to a switch element SW2. In the temporary stop mode, the PWM generator 16 outputs a signal for setting the motor 6 to the short-circuit brake state or the disconnected state to the driver 3.

The capture unit 17 obtains a pulse signal outputted from the speed detector 5 and corresponding to the rotation angle of the motor 6, and measures the cycle of the pulse signal.

The rotation speed detector 18 calculates the rotation speed of the motor 6 based on the cycle of the pulse signal measured by the capture unit 17. The rotation speed detector 18 outputs the calculated rotation speed to the speed comparator 12.

The driver 3 drives the motor 6. The driver 3 includes a predriver 21 and an H-bridge circuit 22.

The predriver 21 connects the PWM generator 16 to the switch elements SW1, SW2 of the H-bridge circuit 22. The signals outputted from the comparator 19 of the PWM generator 16 are inputted respectively into the switch elements SW1, SW2 via the predriver 21.

The H-bridge circuit 22 includes four switch elements SW1 to SW4. The switch elements SW1, SW2 are connected in series between a power supply voltage terminal P and a ground terminal in a line connected to one terminal of the motor 6. Meanwhile, the switch elements SW3, SW4 are connected in series between the power supply voltage terminal P and the ground terminal in a line connected to another terminal of the motor 6. In the H bridge circuit 22, the switch elements SW1, SW4 located on a diagonal form one pair and the switch elements SW2, SW3 located on a diagonal form another pair. For example, in the normal mode, the switch elements SW1, SW4 are set to an on state in an H (high) period of the PWM signal inputted into the switch element SW1. In this case, the PWM signal inputted in the switch element SW2 is in an L (low) period, and the switch elements SW2, SW3 are set to an off state.

The power supply 4 supplies voltage to the driver 3. The power supply 4 is connected to the power supply voltage terminal P of the H-bridge circuit 22.

The speed detector 5 outputs the pulse signal corresponding to the rotation angle of the motor 6. The speed detector 5 is formed of, for example, a rotary encoder.

In control performed by the aforementioned drive control device 1, the PID adjuster 13, the drive-voltage duty-ratio calculator 14, the carrier signal generator 15, the PWM generator 16, and the driver 3 form a control element. A control target is an electrical system including the motor 6 and an entire mechanical system. The controlled variable is the rotation speed of the motor 6. The speed detector 5, the capture unit 17, and the rotation speed detector 18 form a feedback element (negative feedback loop of the rotation speed of the motor).

Next, the control target in the control of the drive control device 1 is described.

First, the control target in the mechanical system is described.

Figure 2:
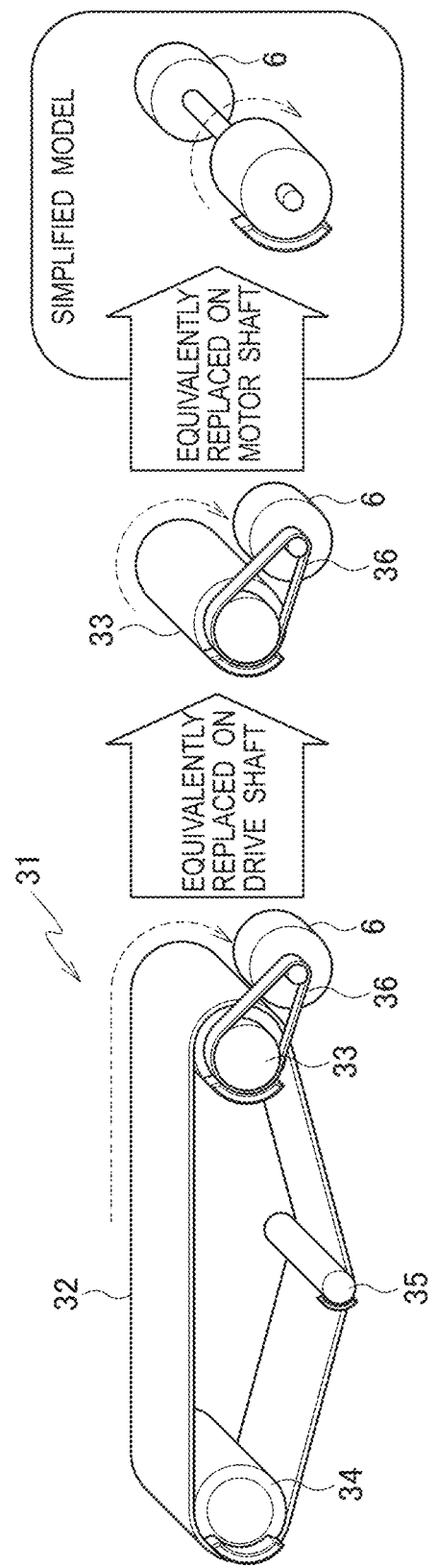
FIG. 2 is a diagram illustrating an example of a control target in a mechanical system.

The control target in the mechanical system includes, for example, a sheet conveyer 31 provided in a printing device as illustrated in FIG. 2. The sheet conveyer 31 has a conveyer belt 32. The conveyer belt 32 is an annular belt wound around a drive roller 33 and driven rollers 34, 35. The drive roller 33 is rotationally driven by the motor 6. The driven rollers 34, 35 follow the conveyer belt 32. A drive belt 36 transmits drive force of the motor 6 to the drive roller 33. Drive of the motor 6 causes the drive roller 33 to rotate and rotation of the conveyer belt 32 transfers a sheet placed on the conveyer belt 32.

As illustrated in FIG. 2, the mechanical system can be expressed by a simplified model in which the conveyer belt 32 and the like of the sheet conveyer 31 is equivalently replaced on a motor shaft.

Figure 3:
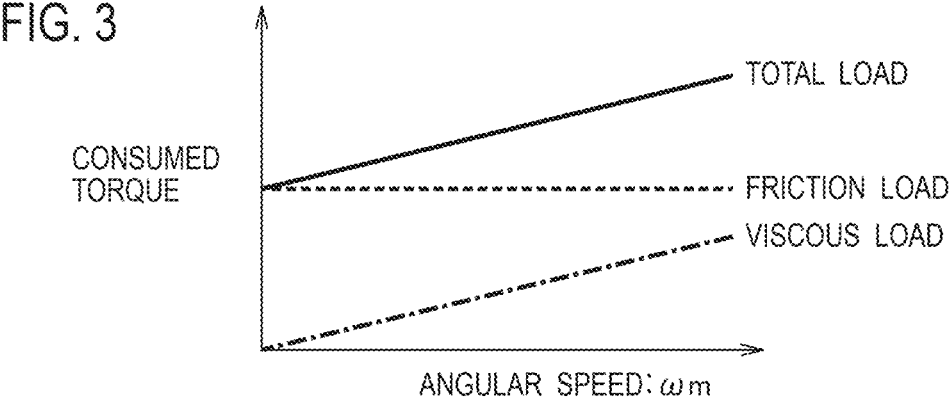
FIG. 3 is a diagram illustrating a load characteristic of the mechanical system.

Note that, as illustrated in FIG. 3, a load of the mechanical system (total load) is the sum of a friction load and a viscous load. An equation of motion (Newton's second law) of the simplified model of the mechanical system having such a load characteristic is expressed by the following formula (1)

$$Tm(t) = Jm \cdot d\omega m(t)/dt + Wq \cdot \omega m(t) + To \ldots \quad (1)$$

ωm [rad/sec]: angular speed
Tm [N·m]: supplied torque
Jm [Kg·m²]: moment of inertia
Wq [N·m/(rad/sec)]: viscous load resistance
To [N·m]: friction load torque.

When the formula (1) is Laplace-transformed into an S function expression, the following formula (2) is obtained.

$$Tm(s) = Jm \cdot S \cdot \omega m(s) + Wq \cdot \omega m(s) + To \ldots \quad (2),$$

Accordingly, an angular speed (rotation speed) ωm(s) can be obtained from the following formula (3).

$$\omega m(s) = (Tm(s) - To)/(Jm \cdot S + Wq) \ldots \quad (3),$$

Figure 4:
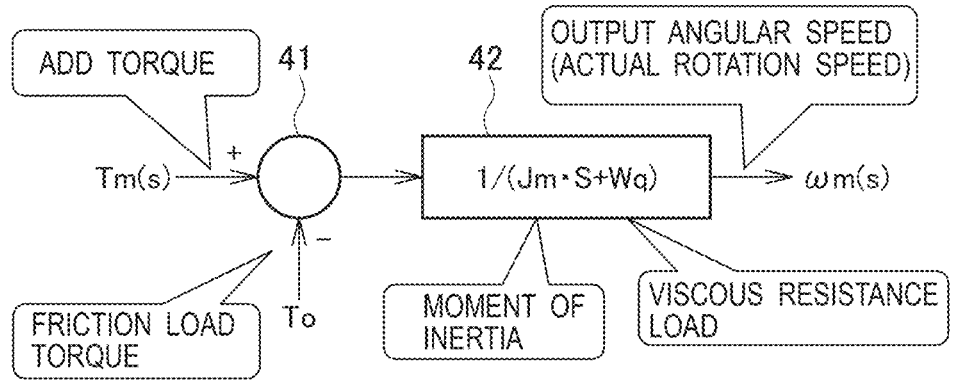
FIG. 4 is a block line diagram of the control target in the mechanical system.

FIG. 4 illustrates an expression of the control target in the mechanical system in a block line diagram. In FIG. 4, a summing point 41 outputs a value (Tm(s)−To) obtained by subtracting the friction load torque To from the torque Tm(s). A block 42 outputs the angular speed (rotation speed)

ωm(s) expressed by the formula (3) by multiplying (Tm(s)−To) inputted from the summing point 41 by 1/(Jm·S+Wq).

Next, the control target in the electrical system is described.

Figure 5:
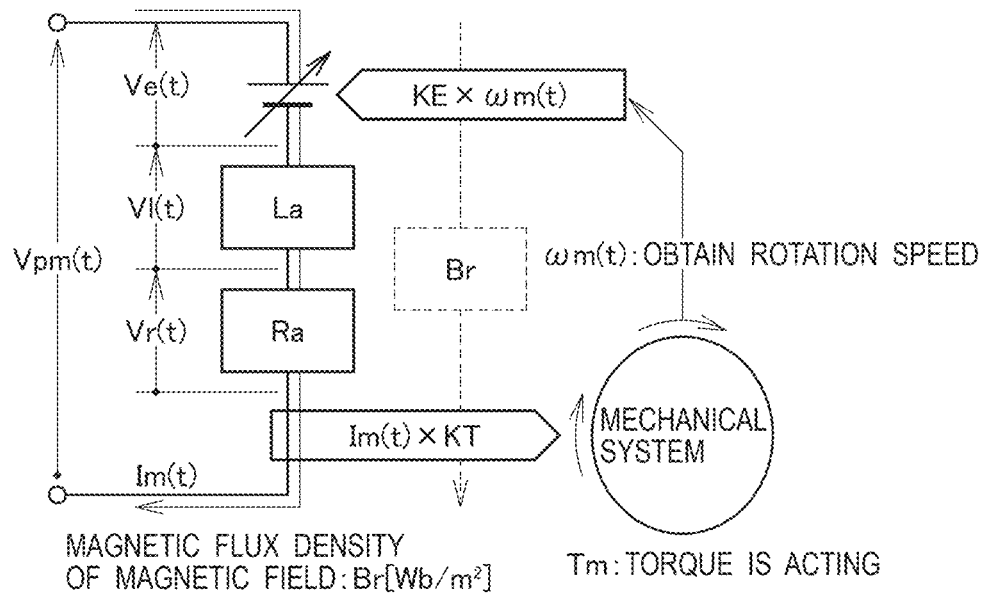
FIG. 5 is an equivalent circuit diagram of a motor.

The control target in the electrical system is the motor 6. The motor 6 which is a DC motor can be expressed by an equivalent circuit as illustrated in FIG. 5. In this description, contents of parameters are as described below.

Vpm [V]: inter-terminal voltage (PWM voltage supplied to the motor)
Ve [V]: reverse induced voltage (voltage generated by rotation of the motor itself)
KE [V/(rad/sec)]: induced voltage constant (constant for converting the rotation speed to the induced voltage)
La [H]: armature winding inductance
Ra [Ω]: armature winding resistance
Im [A]: armature winding current
Kt [N·m/A]: torque constant (constant for converting a current to torque)
Tm [N·m]: generated torque
ωm [rad/sec]: angular speed.

In the equivalent circuit illustrated in FIG. 5, expression formulae of the motor 6 are as illustrated in the following formulae (4) to (6).

$$Vpm(t) = La \cdot dIm(t)/dt + Ra \cdot Im(t) + Ve(t) \ldots \quad (4)$$

$$Ve(t) = KE \cdot \omega m(t) \ldots \quad (5)$$

$$Tm(t) = KT \cdot Im(t) \ldots \quad (6).$$

The following formulae (7) to (9) are obtained by Laplace-transforming the formulae (4) to (6) into S-function expression.

$$Vpm(s) = La \cdot S \cdot Im(s) + Ra \cdot Im(s) + Ve(s) \ldots \quad (7)$$

$$Ve(s) = KE \cdot \omega m(s) \ldots \quad (8)$$

$$Tm(s) = KT \cdot Im(s) \ldots \quad (9).$$

From the formulae (7) and (8), the armature winding current Im(s) is expressed by the following formula (10).

$$Im(s) = (Vpm(s) - KE \cdot \omega m(s))/La \cdot S + Ra) \ldots \quad (10).$$

Figure 6:
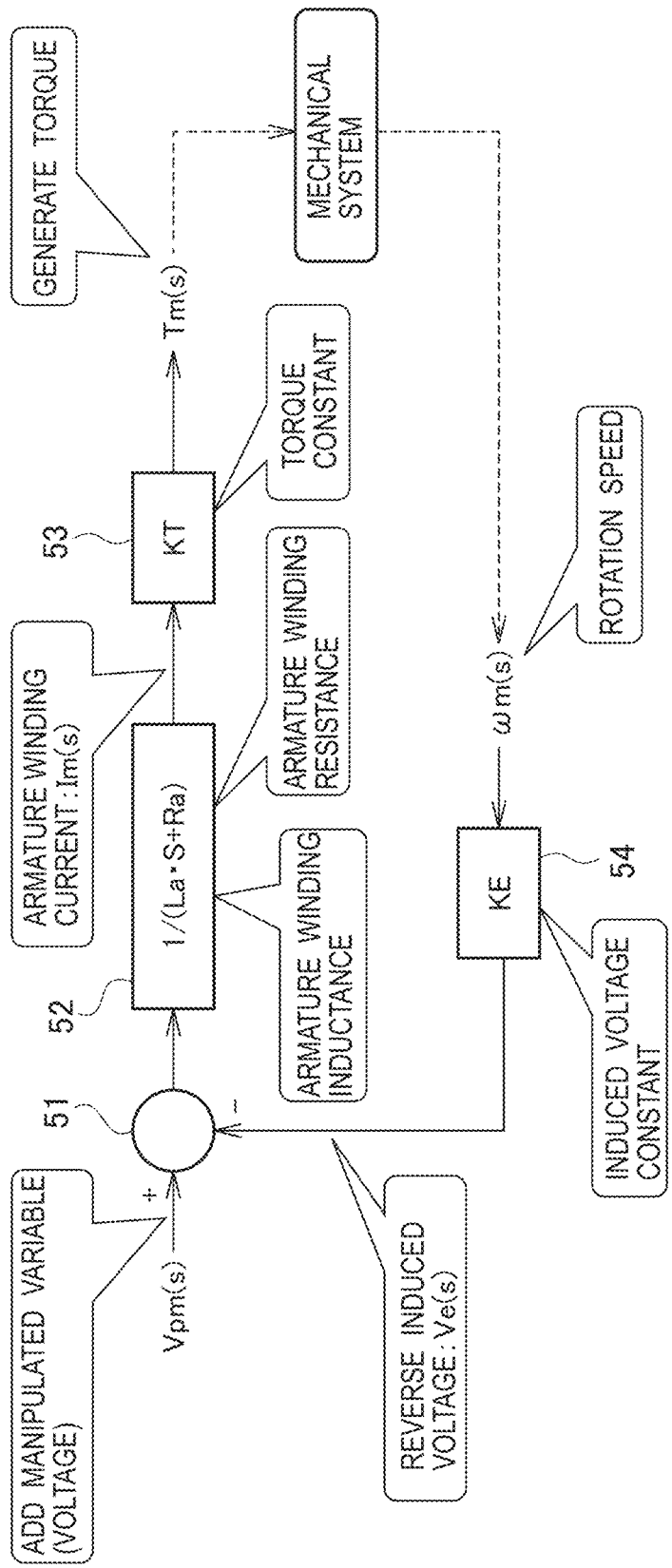
FIG. 6 is a block line diagram of the motor.

FIG. 6 illustrates an expression of the equivalent circuit illustrated in FIG. 5 in a block line diagram. In FIG. 6, a summing point 51 outputs a value (Vpm(s)−Ve) obtained by subtracting the reverse induced voltage Ve from the inter-terminal voltage Vpm(s). A block 52 multiples (Vpm(s)−Ve) inputted from the summing point 51 by 1/(La·S+Ra) and outputs the armature winding current Im(s) expressed by the formula (10). A block 53 multiplies the armature winding current Im(s) by the torque constant KT and outputs the torque Tm(s) expressed by the formula (9). The torque Tm(s) acts on the mechanical system and the angular speed (rotation speed) ωm(s) is obtained. A block 54 multiples the angular speed ωm(s) by the induced voltage constant KE and outputs the reverse induced voltage Ve(S) expressed by the formula (8) to the summing point 51.

Figure 7:
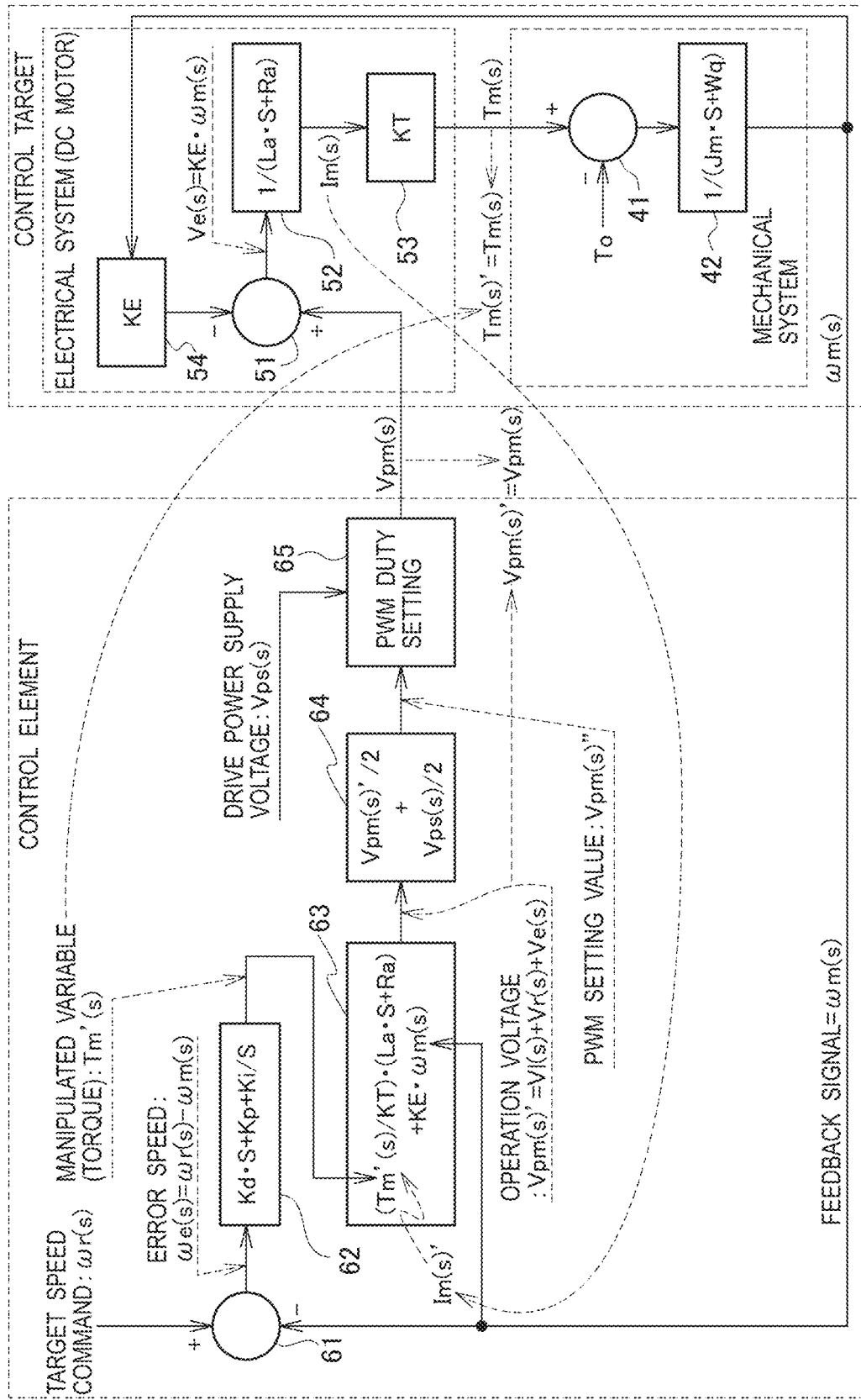
FIG. 7 is a block line diagram of a drive control device in the embodiment.

Next, an operation of the rotation speed control in the drive control device 1 in the normal mode is described by using the block line diagram of FIG. 7. Note that portions of the control targets in the mechanical system and the electrical system in the block line diagram of FIG. 7 are the same as those in the block line diagrams illustrated in FIGS. 4 and 6.

In FIG. 7, a summing point 61 subtracts the angular speed (rotation speed) ωm(s) of the motor 6 from a target value ωr(s) of the rotation speed of the motor 6 and outputs the error speed ωe(s). The calculation of the summing point 61 corresponds to processing by the speed comparator 12 in FIG. 1. The target value ωr(s) is outputted to speed comparator 12 by the speed setter 11. The angular speed ωm(s) is calculated by the rotation speed detector 18 according to the output pulse signal of the speed detector 5.

A block 62 performs appropriate gain adjustment for each PID element based on the equation of motion in the aforementioned formula (1) for the error speed ωm(s) inputted from the summing point 61, and calculates a torque Tm'(s) required to set the rotation speed of the motor 6 to the target value ωr(s). In this case, Kd is a differential (acceleration) gain. Kp is a proportional (speed) gain. Ki is an integral (displacement) gain. The calculation of the block 62 corresponds to processing by the PID adjuster 13 in FIG. 1.

A block 63 calculates a drive voltage Vpm(s)' of the motor 6 in the synchronous rectification type, based on the torque Tm'(s) inputted from the block 62, the angular speed ωm(s) of the motor 6, and the electrical specification (electrical parameter) of the motor 6. The armature winding inductance La, the armature winding resistance Ra, the torque constant KT, and the induced voltage constant KE are used as the electrical parameters of the motor 6. The drive voltage Vpm(s)' is calculated by using the following formula (11).

$$\begin{aligned} Vpm(s)' &= V1(s) + Vr(s) + Ve(s) \\ &= (Tm'(s)/KT) \cdot (La \cdot S + Ra) + KE \cdot \omega m(s) \end{aligned} \quad (11)$$

The current Im(s)' to flow through the motor 6 is calculated by using the following formula (12).

$$Im(s)' = Tm'(s)/KT \ldots \quad (12).$$

The calculation of the block 63 corresponds to part of the processing by the drive-voltage duty-ratio calculator 14 of FIG. 1. The angular speed ωm(s) of the motor 6 is inputted from the rotating speed detector 18 into the drive-voltage duty-ratio calculator 14 to be used for the calculation of the reverse induced voltage Ve(s) in the calculation of the drive voltage Vpm(s)'.

A block 64 calculates a PWM setting value Vpm(s)" corresponding to the drive voltage Vpm(s)' inputted from, the block 63. The PWM setting value Vpm(s)" is used to generate the PWM signal with the PWM generator 16 of FIG. 1. The PWM setting value Vpm(s)" is calculated by the following formula (13).

$$Vpm(s)'' = Vpm(s)'/2 + Vps(s)/2 \ldots \quad (13).$$

In this formula, Vps is a drive power supply voltage of the power supply 4 of FIG. 1. The calculation of the block 64 corresponds to part of the processing by the drive-voltage duty-ratio calculator 14 of FIG. 1.

In a block 65, the duty ratio of the PWM signal corresponding to the drive voltage Vpm(s)' is set and the motor 6 is driven by using the PWM signal with the set duty ratio. The duty ratio of the PWM signal (PWM_Duty) is calculated from the following formula (14).

$$PWM\_Duty\ [\%] = (Vpm(s)' + Vps(s)) \cdot 100/2 \cdot Vps(s) \ldots \quad (14).$$

It is known that, in the synchronous rectification type, the average value of the drive voltage of the motor and the duty ratio of the PWM signal are proportional to each other. Moreover, when the duty ratio is 50%, the average value of the drive voltage is zero and the motor is in a stop state. When the duty ratio is greater than 50%, the average value of the drive voltage is a positive value. When the duty ratio is less than 50%, the average value of the drive voltage is a negative value. The motor can be thereby rotated in a forward direction (CW direction) and a reverse direction (CCW direction).

The drive voltage Vpm(s)' calculated by using the formula (11) is a value between −Vps(s) and +Vps(s). When Vpm(s)'=Vps(s), the duty ratio is 100%. When Vpm(s)'=−Vps(s), the duty ratio is 0%. When Vpm(s)'=0, the duty ratio is 50%. Moreover, from the aforementioned characteristic of the synchronous rectification type, the drive voltage Vpm(s)' and the duty ratio are proportional. Based on this fact, the duty ratio of the PWM signal corresponding to the drive voltage Vpm(s)' is calculated from the formula (14).

The processing of the block 65 corresponds to the processing of part of the drive-voltage duty-ratio calculator 14, the carrier signal generator 15, the PWM generator 16, and the driver 3 of FIG. 1.

The inter-terminal voltage Vpm(s) of the motor 6 is controlled by the aforementioned control to be set equal to the drive voltage Vpm(s)' which is calculated by the block 63 and which is used to set the rotation speed of the motor 6 to the target value ωr(s). The torque Tm(s) generated in the motor 6 by the drive at the drive voltage Vpm(s)' becomes equal to the torque Tm'(s) calculated in the block 62. Moreover, the current (armature winding current) Im(s) flowing in the motor 6 becomes equal to the current Im(s)' calculated from Tm'(s).

Figure 8:
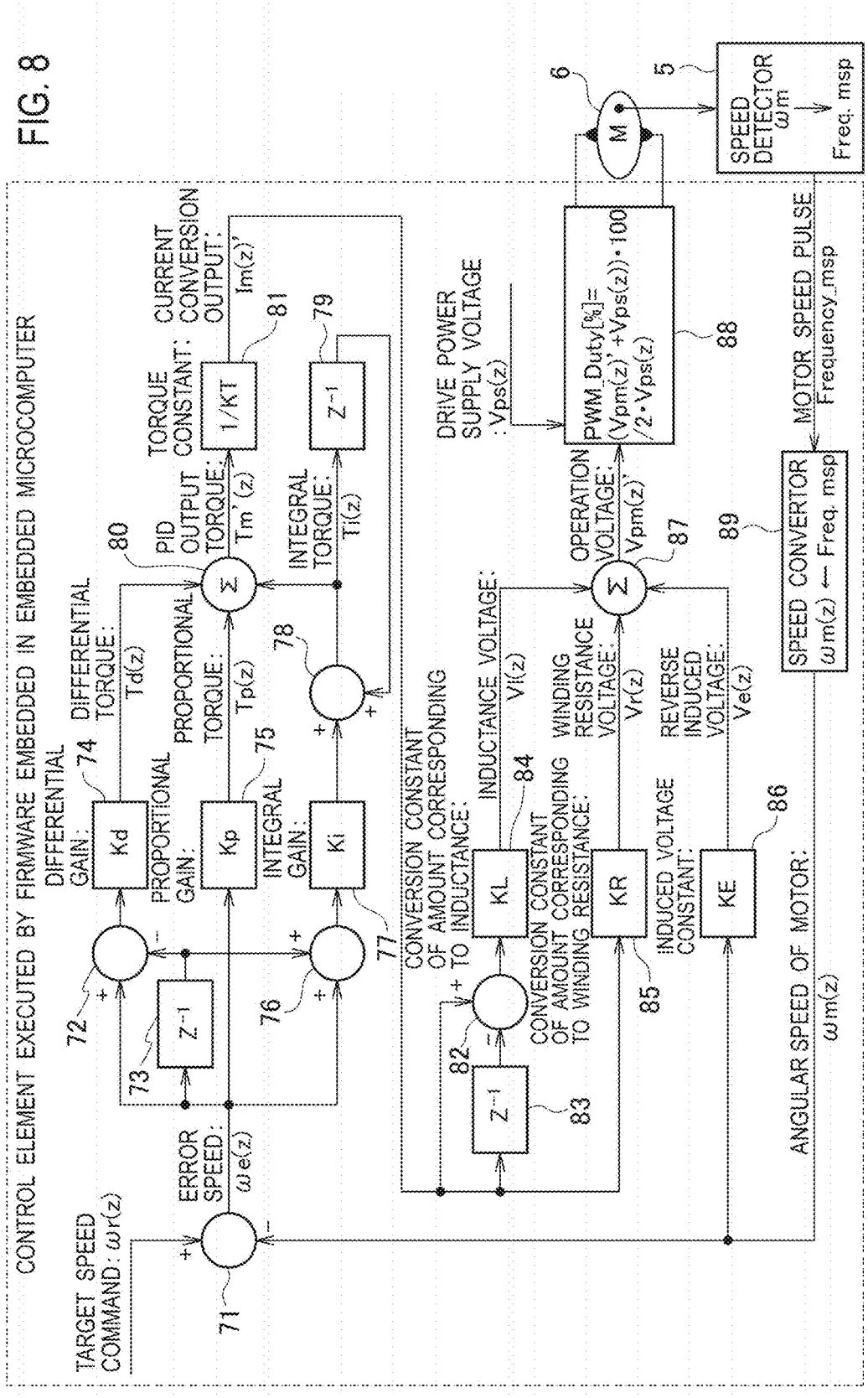
FIG. 8 is a schematization of an Algol of rotation speed control in the drive control device in the embodiment.

Next, an Algol (Algorithmic Language) of the rotation speed control in the drive control device 1 in the normal mode is described by using FIG. 8. FIG. 8 is schematization of the Algol (expression obtained by performing Z conversion on an S function) of the rotation speed control. This Algol is executed by firmware embedded in the embedded microcomputer 2.

In FIG. 8, a subtractor 71 subtracts an angular speed (rotation speed) ωm(z) of the motor 6 from a target value ωr(z) of the rotation speed of the motor 6 and outputs an error speed ωe(z). The subtracter 71 corresponds to the speed comparator 12 of FIG. 1.

A subtractor 72 subtracts an error speed ωe(z) subjected to unit delay in a delayer 73 from the error speed ωe(z) inputted from the subtractor 71.

A differential calculator 74 calculates a differential torque Td(z) by multiplying the calculation result of the subtractor 72 by the differential gain Kd.

A proportion calculator 75 calculates a proportional torque Tp(z) by multiplying the error speed ωe(z) inputted from the subtractor 71 by the proportional gain Kp.

An adder 76 adds the error speed ωe(z) subjected to unit delay in the delayer 73 to the error speed ωe(z) inputted from the subtractor 71.

An integral calculator 77 multiplies the calculation result of the adder 76 by the integral gain Ki. An adder 78 adds an integral torque Ti(z) subjected to unit delay in a delayer 79 to the calculation result of the integral calculator 77 and calculates the integral torque Ti(z).

An adder 80 adds up the differential torque Td(z), the proportional torque Tp(z), and the integral torque Ti(z) to calculate a PID output torque Tm'(z). The PID output torque Tm'(z) is a torque required to set the rotation speed of the motor 6 to the target value ωr(z).

The processing by the subtracter 72, the delayer 73, the differential calculator 74, the proportion calculator 75, the adder 76, the integral calculator 77, the adder 78, the delayer 79, and the adder 80 corresponds to processing by the PID adjuster 13 of FIG. 1.

A current converter 81 converts the PID output torque Tm'(z) to a current Im(z)' to flow in the motor 6 by dividing the PID output torque Tm'(z) by a torque constant KT.

A subtracter 82 subtracts the current Im(z)' subjected to unit delay in a delayer 83 from the current Im(z)' inputted from the current converter 81.

An inductance voltage calculator 84 calculates an inductance voltage Vl(z) by multiplying the calculation result of the subtracter 82 by a conversion constant KL of an amount corresponding to inductance.

A winding resistance voltage calculator 85 calculates a winding resistance voltage Vr(z) by multiplying the current Im(z)' inputted from the current converter 81 by a conversion constant KR of an amount corresponding to a winding resistance.

A reverse induced voltage calculator 86 calculates a reverse induced voltage Ve(z) by multiplying the angular speed ωm(s) of the motor 6 by a induced voltage constant KE.

An adder 87 calculates a drive voltage Vpm(z)' of the motor 6 in the synchronous rectification type by adding up the inductance voltage Vl(z), the winding resistance voltage Vr(z), and the reverse induced voltage Ve(z).

A duty ratio calculator 88 calculates the duty ratio (PWM_ Duty) of the PWM signal by using the aforementioned formula (14). The motor 6 is driven by using the PWM signal with the calculated duty ratio.

The processing by the current converter 81, the subtracter 82, the delayer 83, the inductance voltage calculator 84, the winding resistance voltage calculator 85, the reverse induced voltage calculator 86, the adder 87, and the duty ratio calculator 88 corresponds to the processing by the drive-voltage duty-ratio calculator 14 of FIG. 1.

A speed converter 89 converts the pulse signal (motor speed pulse) outputted from the speed detector 5 to the angular speed ωm(z) of the motor 6. The angular speed ωm(z) is outputted to the subtracter 71 and the reverse induced voltage calculator 86. The processing by the speed converter 89 corresponds to the processing by the capture unit 17 and the rotation speed detector 18 of FIG. 1.

Next, an operation of generating the PWM signal in the PWM generator 16 is described.

Figure 9:
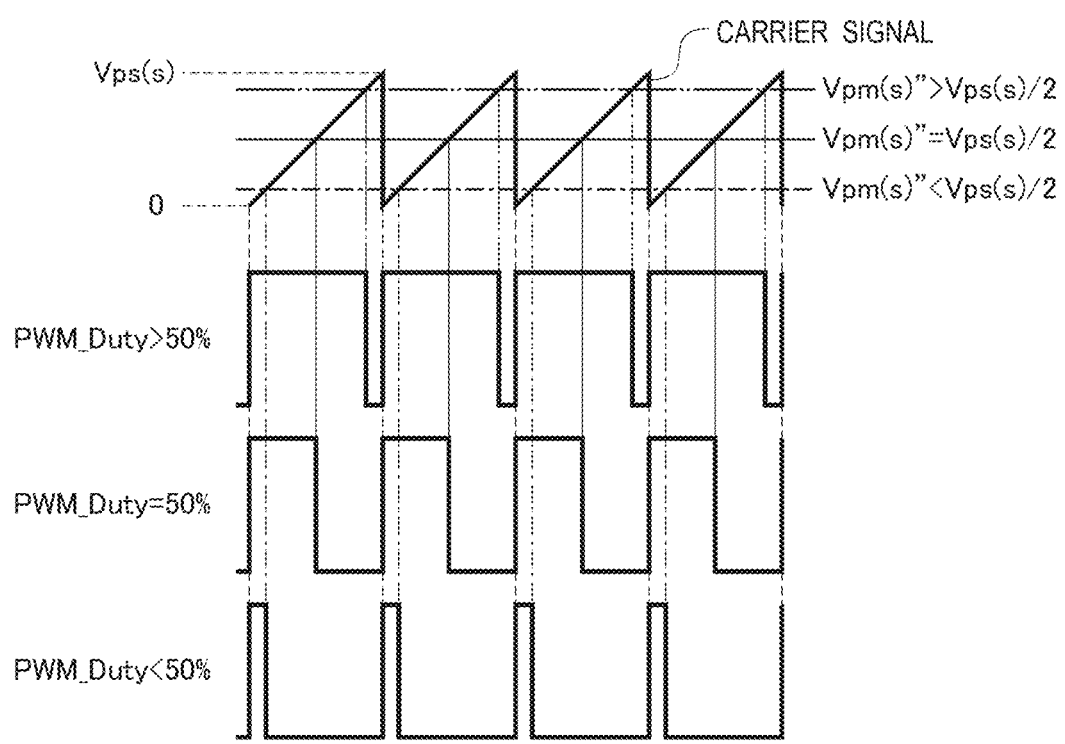
FIG. 9 is a diagram explaining an operation of generating a PWM signal in a PWM generator.

The carrier signal inputted from the carrier signal generator 15 into the comparator 19 of the PWM generator 16 takes a value between zero and Vps(s) as depicted in FIG. 9.

The PWM setting value Vpm(s)" calculated by using the aforementioned formula (13) also takes a value between zero and Vps(s). When the drive voltage Vpm(s)' of the motor 6 is equal to zero, Vpm(s)"=Vps(s)/2. When Vpm(s)'>0, Vpm(s)">Vps(s)/2. When Vpm(s)'<0, Vpm(s)"<Vps(s)/2.

The comparator 19 compares the carrier signal and the PWM setting value Vpm(s)" and generates a PWM signal which is at a high level in a period when the value of the PWM setting value Vpm(s)" is greater than the value of the carrier signal and which is at a low level in a period when the value of the PWM setting value Vpm(s)" is less than the value of the carrier signal.

A PWM signal whose duty ratio is greater than 50% is thereby generated when Vpm(s)">Vps(s)/2, i.e. when Vpm(s)'>0 as depicted in FIG. 9. Moreover, a PWM signal whose duty ratio is 50% is generated when Vpm(s)"=Vps(s)/2, i.e. when Vpm(s)'=0. A PWM signal whose duty ratio is less than 50% is generated when Vpm(s)"< Vps(s)/2, i.e. when Vpm(s)<0.

Since the PWM generator 16 generates the PWM signal by simply comparing the carrier signal and the PWM setting value Vpm(s)", the PWM signal can be generated in a short time. This achieves performances including highly-accurate rotation speed control of the motor 6 and high-speed response to the target speed command.

The PWM signal generated by the PWM generator 16 is inputted into the driver 3 and the motor 6 is driven according to the duty ratio of the PWM signal.

Next, description is given of an operation of the driver 3 by the PWM control of the synchronous rectification type which is performed in the normal mode.

Figure 10A:
FIG. 10A is a diagram depicting an example of the PWM signal in PWM control of a synchronous rectification type.

When the duty ratio of the PWM signal in the synchronous rectification type is greater than 50%, the PWM signal with the duty ratio of 50% or greater as depicted in FIG. 10A is inputted into the switch element SW1. In the H period of the PWM signal which is depicted by solid lines in FIG. 10A, the switch elements SW1, SW4 are set to on. In the L period depicted by broke lines, the switch elements SW1, SW4 are set to off.

Meanwhile, a PWM signal with the opposite phase to the PWM signal of FIG. 10A is inputted into the switch element SW2. The on/off states of the switch elements SW2, SW3 are thereby set opposite to those of the switch elements SW1, SW4.

Figure 10B:
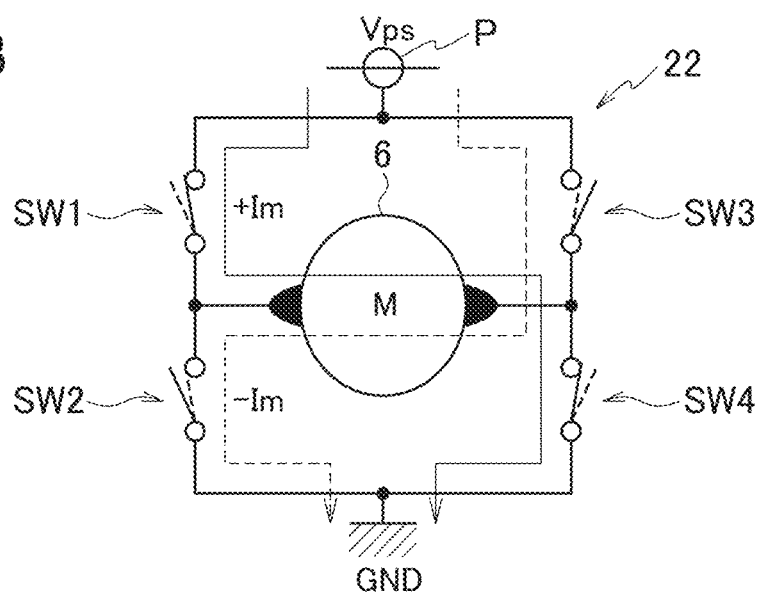
FIG. 10B is a diagram explaining on/off states of switch elements and a current flowing in the motor which correspond to the PWM signal of FIG. 10A.

Accordingly, in the H period, of the PWM signal in FIG. 10A, a positive current (+Im) flows in the motor 6 as depicted in FIG. 10B. Meanwhile, in the L period of the PWM signal in FIG. 10A, a negative current (−Im) flows in the motor 6 as depicted in FIG. 10B. Note that, in FIGS. 10B and 10C, the switch elements SW1 to SW4 are illustrated in a simplified manner.

Figure 10C:
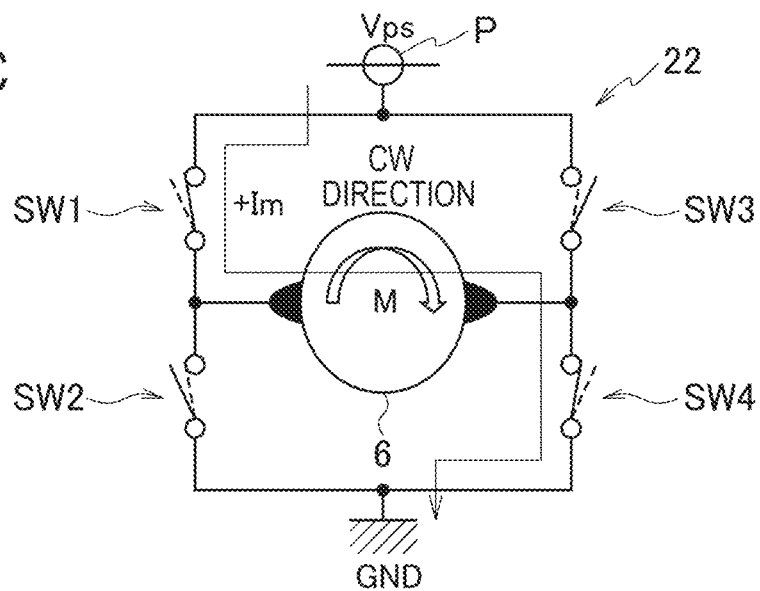
FIG. 10C is a diagram explaining a rotation direction of the motor which corresponds to the PWM signal of FIG. 10A.

In the PWM signal of FIG. 10A, a period in which the positive current (+Im) flows in the motor 6 is longer than a period in which the negative current (−Im) flows in the motor 6. Accordingly, as depicted in FIG. 10C, regarding the currents flowing in the motor 6, the positive current (+Im) is dominant over the negative current (−Im), and the motor 6 rotates in the forward direction (CW direction).

Figure 11A:
FIG. 11A is a diagram depicting another example of the PWM signal in the PWM control of the synchronous rectification type.

When the duty ratio of the PWM signal in the synchronous rectification type is less than 50%, the PWM signal with the duty ratio of 50% or less as depicted in FIG. 11A is inputted into the switch element SW1. In the H period of the PWM signal which is depicted by broken lines in FIG. 11A, the switch elements SW1, SW4 are set to on. In the L period depicted by solid lines, the switch elements SW1, SW4 are set to off.

Meanwhile, a PWM signal with the opposite phase to the PWM signal of FIG. 11A is inputted into the switch element SW2. The on/off states of the switch elements SW2, SW3 are thereby set opposite to those of the switch elements SW1, SW4.

Figure 11B:
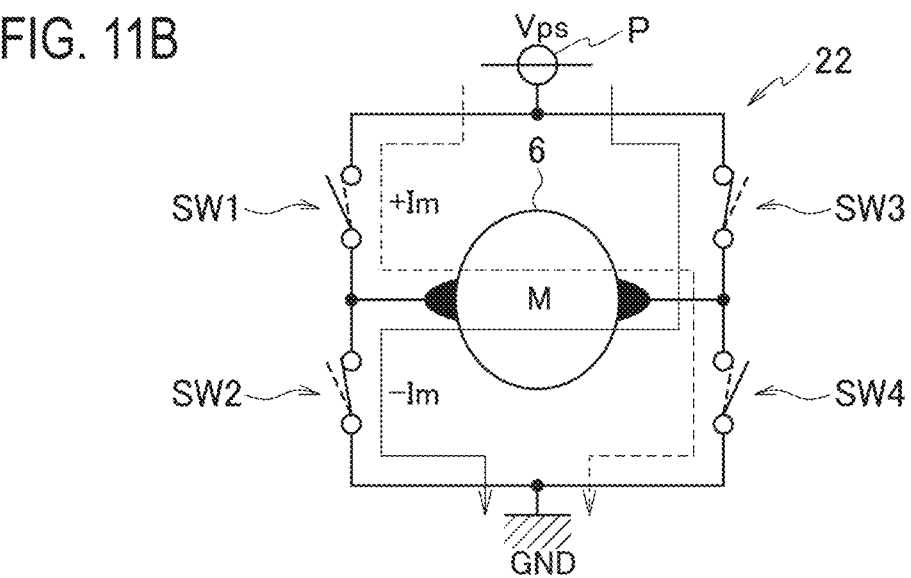
FIG. 11B is a diagram explaining the on/off states of the switch elements and the current flowing in the motor which correspond to the PWM signal of FIG. 11A.
Figure 11C:
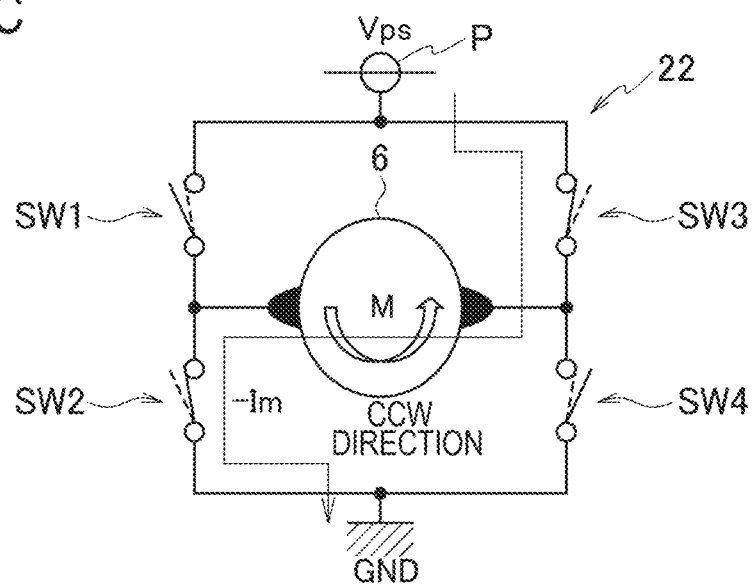
FIG. 11C is a diagram explaining the rotation direction of the motor which corresponds to the PWM signal of FIG. 11A.

In the PWM signal of FIG. 11A, contrary to the case of FIG. 10A, a period in which the negative current (−Im) flows in the motor 6 as depicted in FIG. 11B is longer than a period in which the positive current (+Im) flows in the motor 6 as depicted in FIG. 11B. Accordingly, as depicted in FIG. 11C, regarding the currents flowing in the motor 6, the negative current (−Im) is dominant over the positive current (+Im), and the motor 6 rotates in the reverse direction (CCW direction).

Next, an operation of the drive control device 1 in the temporary stop mode is described.

When the stop period lasts the specified time or longer during the driving of the motor, the speed setter 11 instructs the PWM generator 16 to perform switching from the normal mode to the temporary stop mode by using the PWM control mode command. The speed setter 11 determines whether a stop period lasts for the specified time or longer, based on a preset drive schedule of the motor 6. The specified time is set to such a time that a period in which the motor 6 is set to a stop state in instantaneous rotation direction reversal is excluded from a target of the temporary stop mode. The specified time is set to, for example, about several msec.

When receiving the command to perform switching to the temporary stop mode, the PWM generator 16 outputs, to the driver 3, the signal for setting the motor 6 to the short-circuit brake state or the disconnected state. The motor 6 is thereby set to a state where no current flows therein.

Figure 12A:
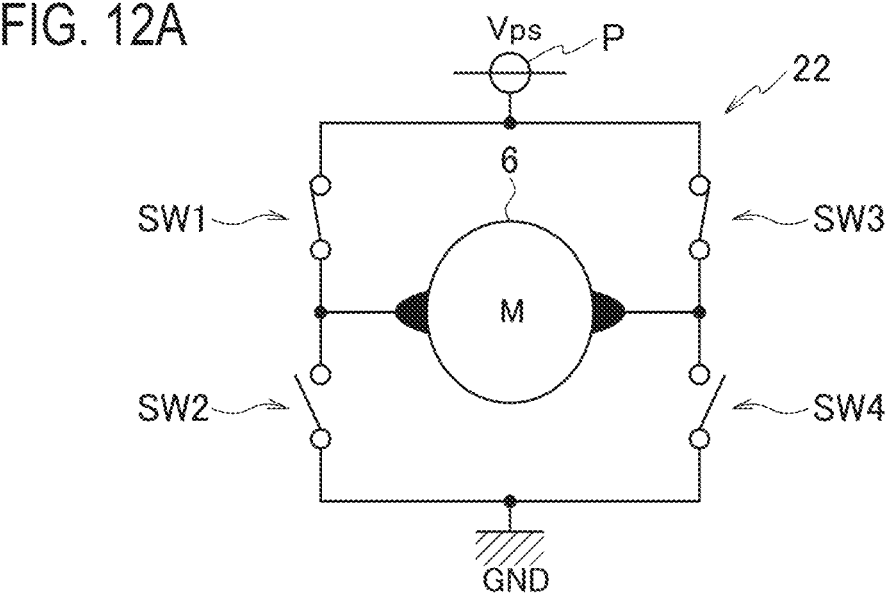
FIG. 12A is a diagram explaining an example of a short-circuit brake state of the motor.
Figure 12B:
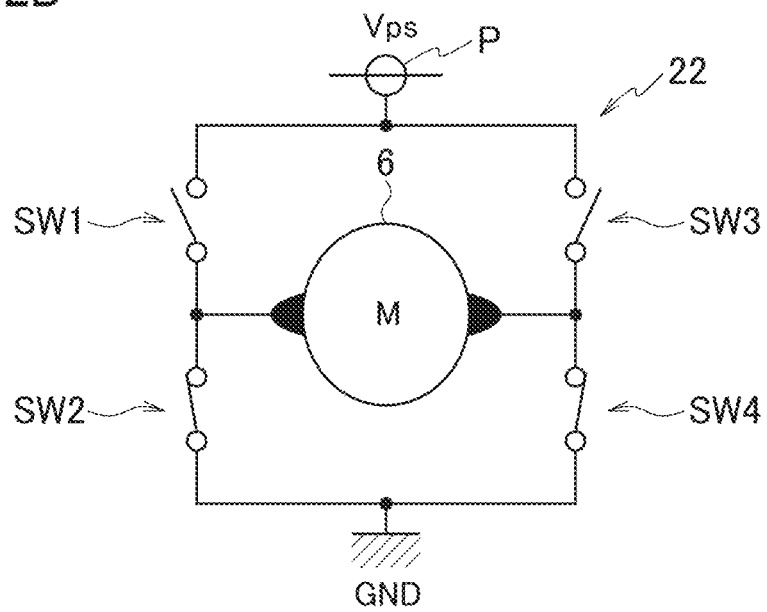
FIG. 12B is a diagram explaining another example of the short-circuit brake state of the motor.

In this case, the short-circuit brake state of the motor 6 is a state in which the on/off states of the switch elements SW1 to SW4 are as depicted in FIGS. 12A or 12B. Specifically, the short-circuit brake state of the motor 6 is a state in which the switch elements SW1, SW3 are set to on and the switch elements SW2, SW4 are set to off (FIG. 12A) or a state in which the switch elements SW1, SW3 are set to off and the switch elements SW2, SW4 are set to on (FIG. 12B).

Figure 13:
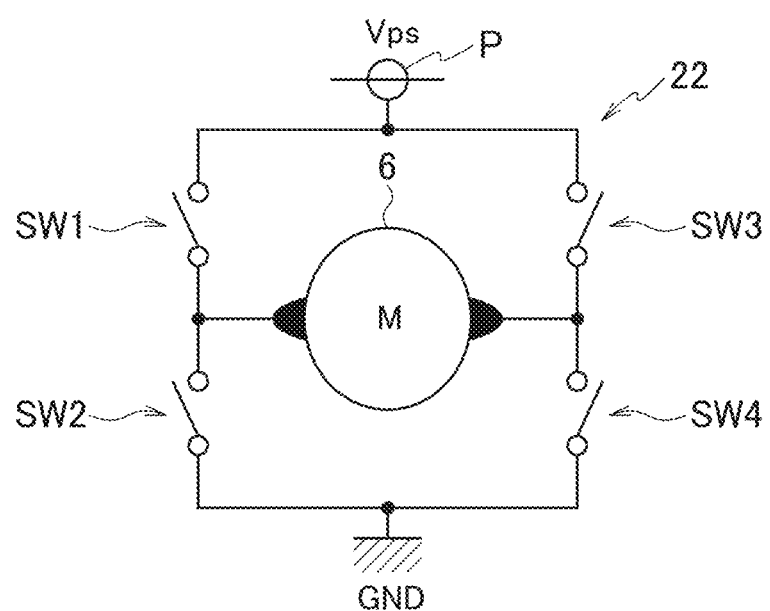
FIG. 13 is a diagram explaining a disconnected state of the motor.

Moreover, the disconnected state of the motor 6 is a state in which all of the switch elements SW1 to SW4 are set to off as depicted in FIG. 13.

When the stop period lasting for the specified time or longer ends, the speed setter 11 instructs the PWM generator 16 to return from the temporary stop mode to the normal mode by using the PWM control mode command. The drive control device 1 thereby returns to the PWM control of the synchronous rectification type.

Description is given of a current flowing in the motor in the case where the duty ratio of the PWM signal in the synchronous rectification type is 50%.

Figure 14A:
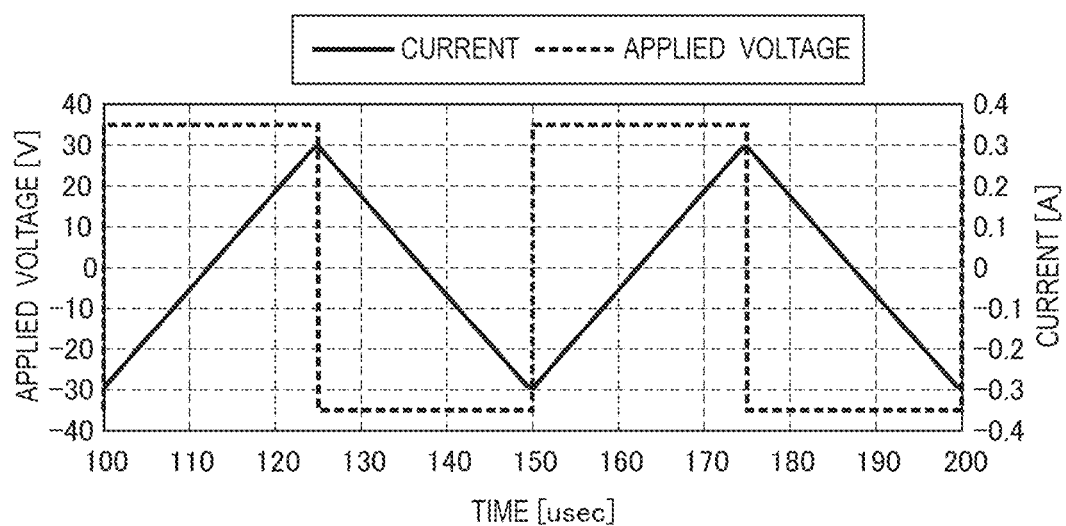
FIG. 14A is a graph depicting an example of a simulation result of the synchronous rectification type in the case where a duty ratio of the PWM signal is 50%.
Figure 14B:
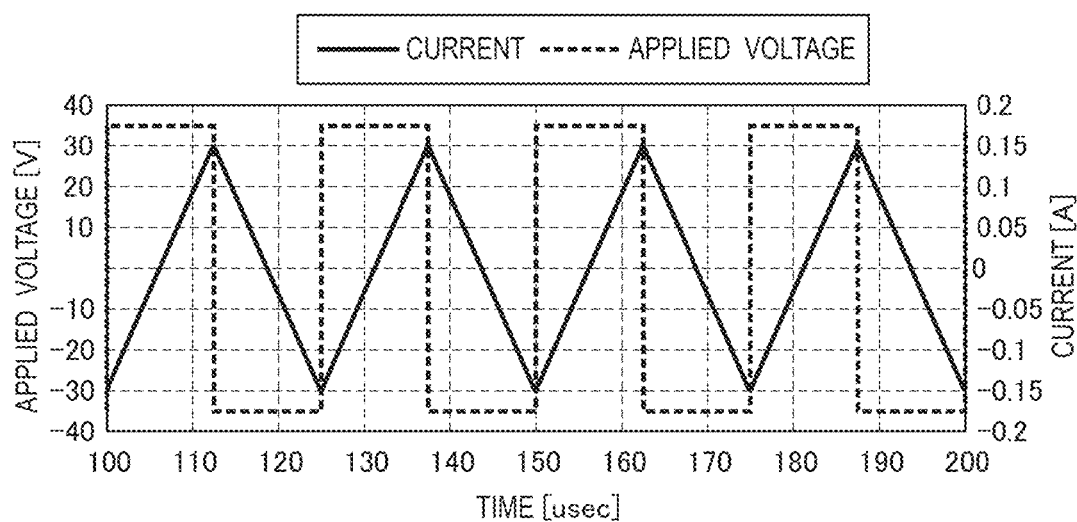
FIG. 14B is a graph depicting another example of the simulation result of the synchronous rectification type in the case where the duty ratio of the PWM signal is 50%.
Figures 15A, 15B:
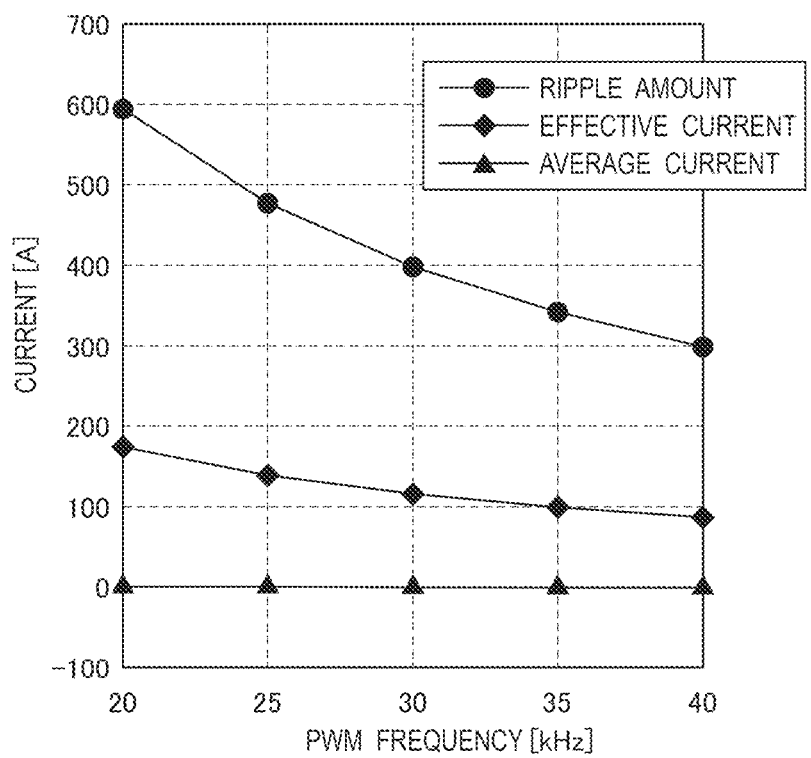
FIG. 15A is a table depicting calculated values of an average current, an effective current, and a ripple amount of the motor in a simulation of the synchronous rectification type in the case where the duty ratio of the PWM signal is 50%.
FIG. 15B is a graph of the table of FIG. 15A.

FIG. 14A is a graph depicting a simulation result of the synchronous rectification type in the case where the frequency (PWM frequency) of the PWM signal is 20 kHz and the duty ratio thereof is 50%. FIG. 14B is a graph depicting a simulation result of the synchronous rectification type in the case where the PWM frequency is 40 kHz and the duty ratio of the PWM signal is 50%. FIG. 15A is a table depicting calculated values of an average current, an effective current, and a ripple amount of the motor in a simulation of the synchronous rectification type in the case where the duty ratio of the PWM signal is 50%. FIG. 15B is a graph of the table of FIG. 15A.

As depicted in FIGS. 14A and 14B, in the PWM control of the synchronous rectification type, voltage applied to the motor is an alternating pulse wave. When the duty ratio of the PWM signal is 50%, the current flowing in the motor is integrated by the inductance of the motor and has a triangle waveform, but the average current value is substantially zero as depicted in FIGS. 15A and 15B. In this state, the motor is set to the stop state by the moment of inertia of a rotating body. However, an alternating ripple current flows in the motor and power loss is generated. Moreover, the temperature of the motor increases.

In view of this, in the embodiment, in the stop period lasting for the specified time or longer during the driving of the motor, instead of setting the duty ratio of the PWM signal to 50%, the PWM control of the synchronous rectification type is suspended and the motor 6 is set to the short-circuit brake state or the disconnected state as described above. This causes no current to flow in the motor 6 and suppresses the power loss and the temperature increase of the motor 6.

Next, measured data of the voltage applied to the motor 6, the current Im flowing in the motor 6, and the angular speed am of the motor 6 in four types of drive patterns (drive patterns A to D) in the drive control device 1 is depicted in FIGS. 16 to 22.

The drive pattern A is a pattern in which, a reverse rotation state, a stop state, a forward rotation state, the stop state, and the reverse rotation state are repeated in this order. The drive pattern B is a pattern in which the reverse rotation state, instantaneous stop, the forward rotation state, and the stop state are repeated in this order. The drive pattern C is a pattern in which the state of the motor 6 is switched between a high-speed forward rotation state and a low-speed forward rotation state. The drive pattern D is a pattern in which the state of the motor 6 is switched between a high-speed reverse rotation state and a low-speed reverse rotation state.

Figure 16:
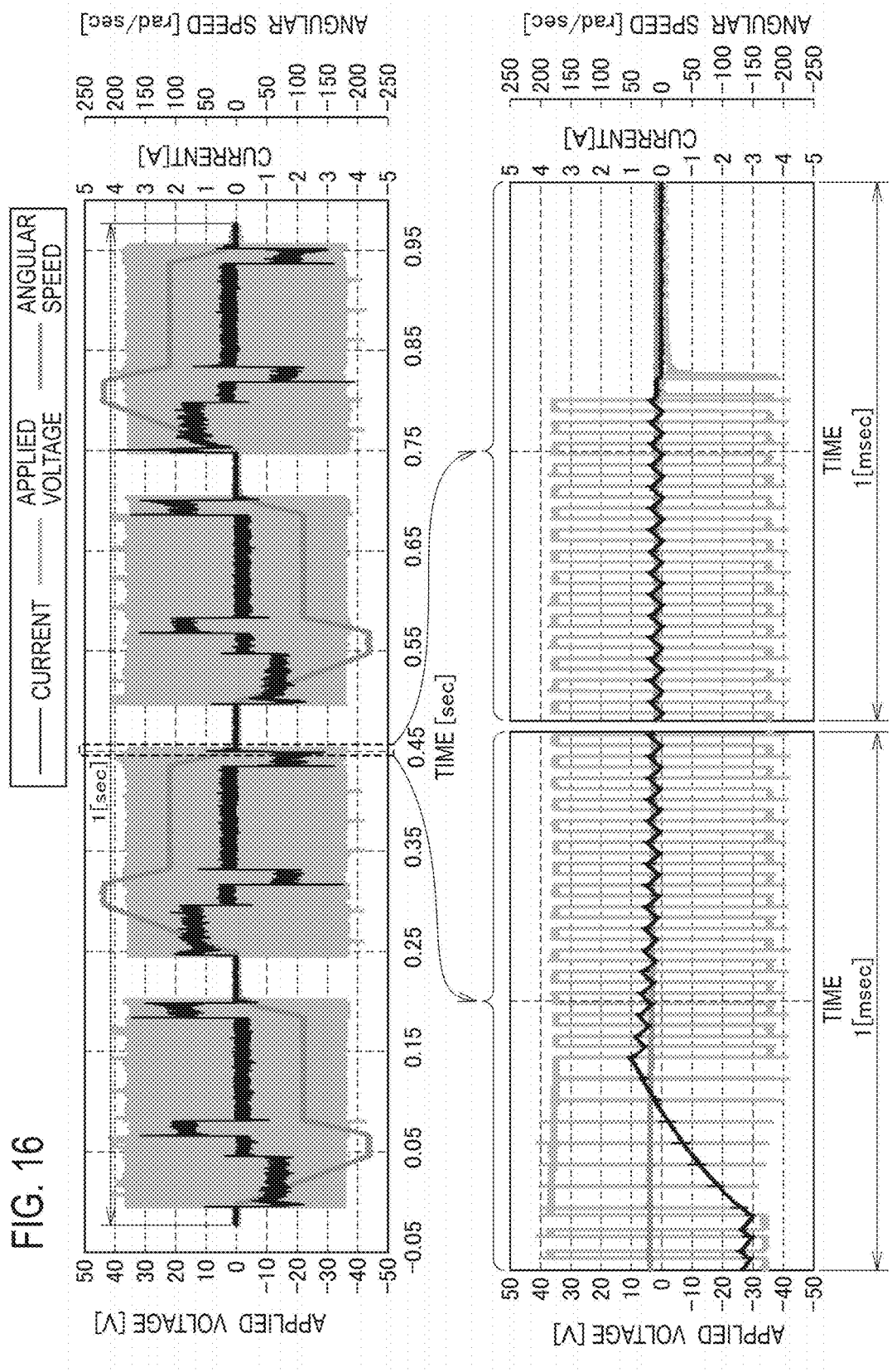
FIG. 16 includes a waveform diagram of measured data of applied voltage, a current, and an angular speed of the motor in a drive pattern A, and enlarged views of waveforms at the time when the motor transitions from a forward rotation state to a stop period lasting for a specified time or longer.

An upper section of FIG. 16 is a waveform diagram of the measured data of the applied voltage, the current Im, and the angular speed ωm of the motor 6 in the drive pattern A. A lower section of FIG. 16 includes enlarged views of waveforms at the time when the motor 6 transitions from the forward rotation state to the stop period lasting for the specified time or longer (transition from the normal mode to the temporary stop mode). An upper section of FIG. 17 is a waveform diagram similar to the upper section of FIG. 16. A lower section of FIG. 17 includes enlarged views of waveforms at the time when the motor 6 transitions from the reverse rotation state to the stop period lasting for the specified time or longer (transition from the normal mode to the temporary stop mode).

Figure 18:
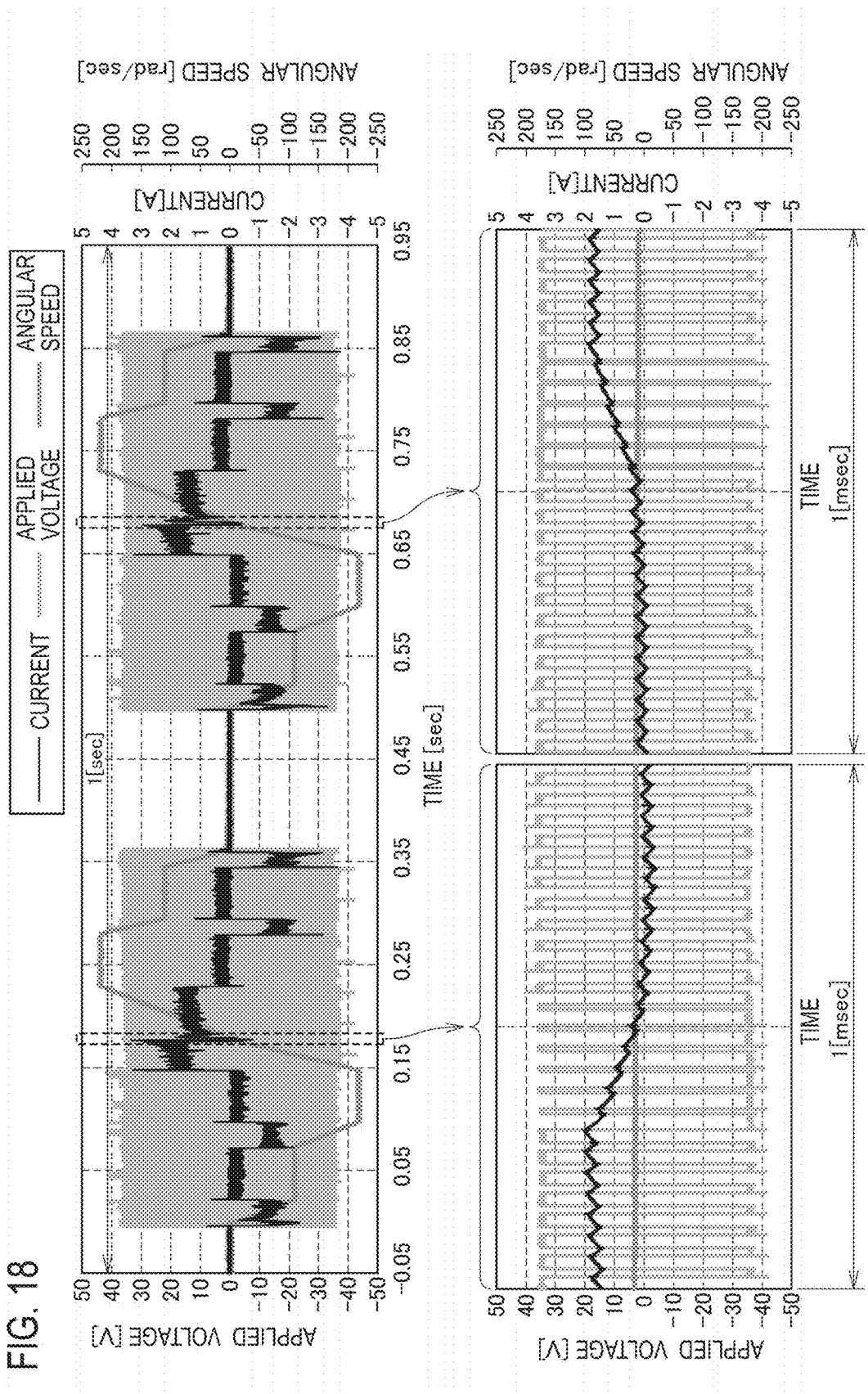
FIG. 18 includes a waveform diagram of measured data of the applied voltage, the current, and the angular speed of the motor in a drive pattern B, and enlarged views of waveforms in a period in which the motor transitions from the reverse rotation state to instantaneous stop, and then to the forward rotation state.

An upper section of FIG. 18 is a waveform diagram of the measured data of the applied voltage, the current Im, and the angular speed ωm of the motor 6 in the drive pattern B. A lower section of FIG. 18 includes enlarged views of waveforms in a period in which the motor 6 transitions from the reverse rotation state to the instantaneous stop, and then to the forward rotation state.

Figure 19:
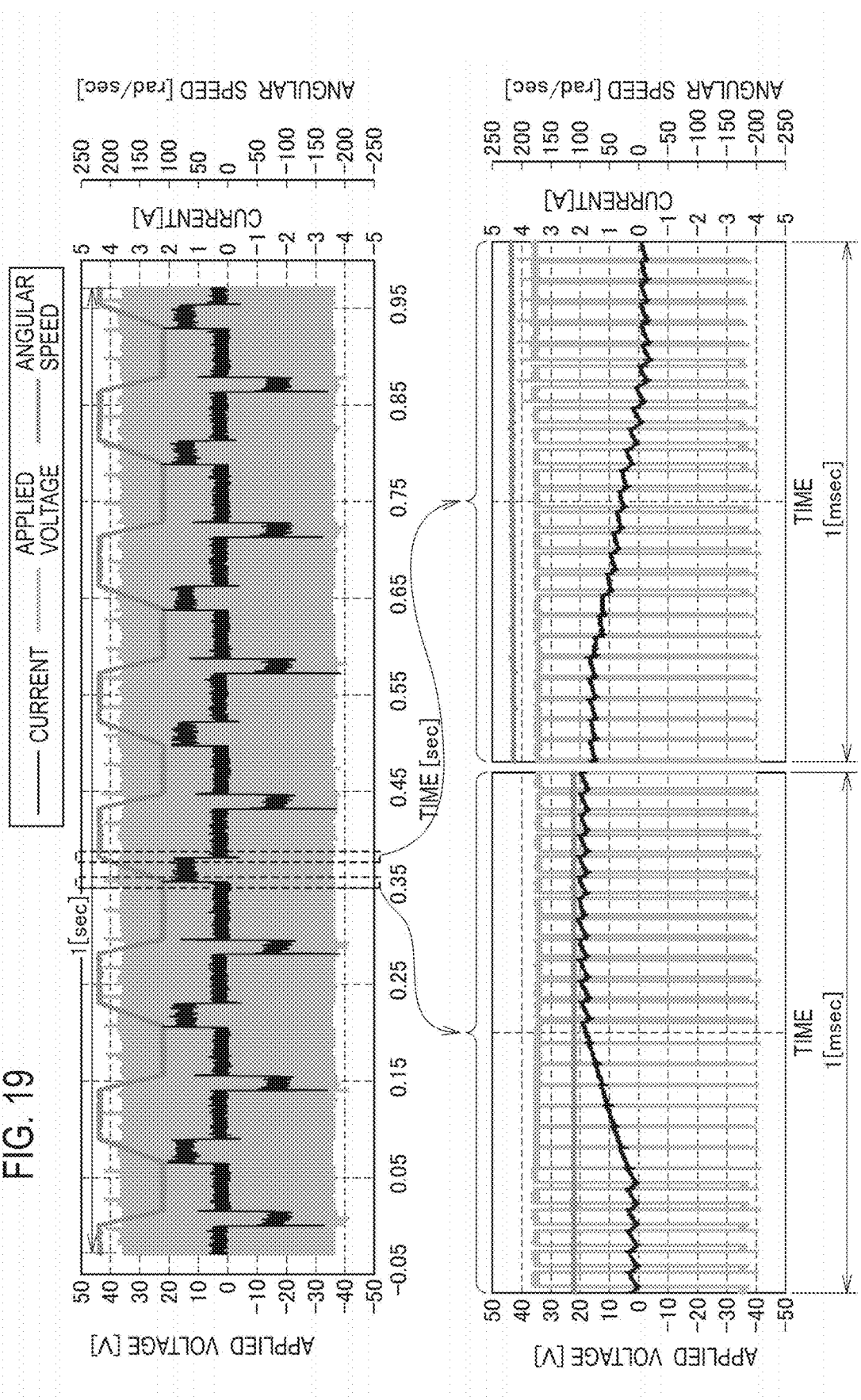
FIG. 19 includes a waveform diagram of measured data of the applied voltage, the current, and the angular speed of the motor in a drive pattern C, and enlarged views of waveforms in a period in which acceleration is started in transition from a low-speed forward rotation state to a high-speed forward rotation state and a period in which the acceleration is completed.
Figure 20:
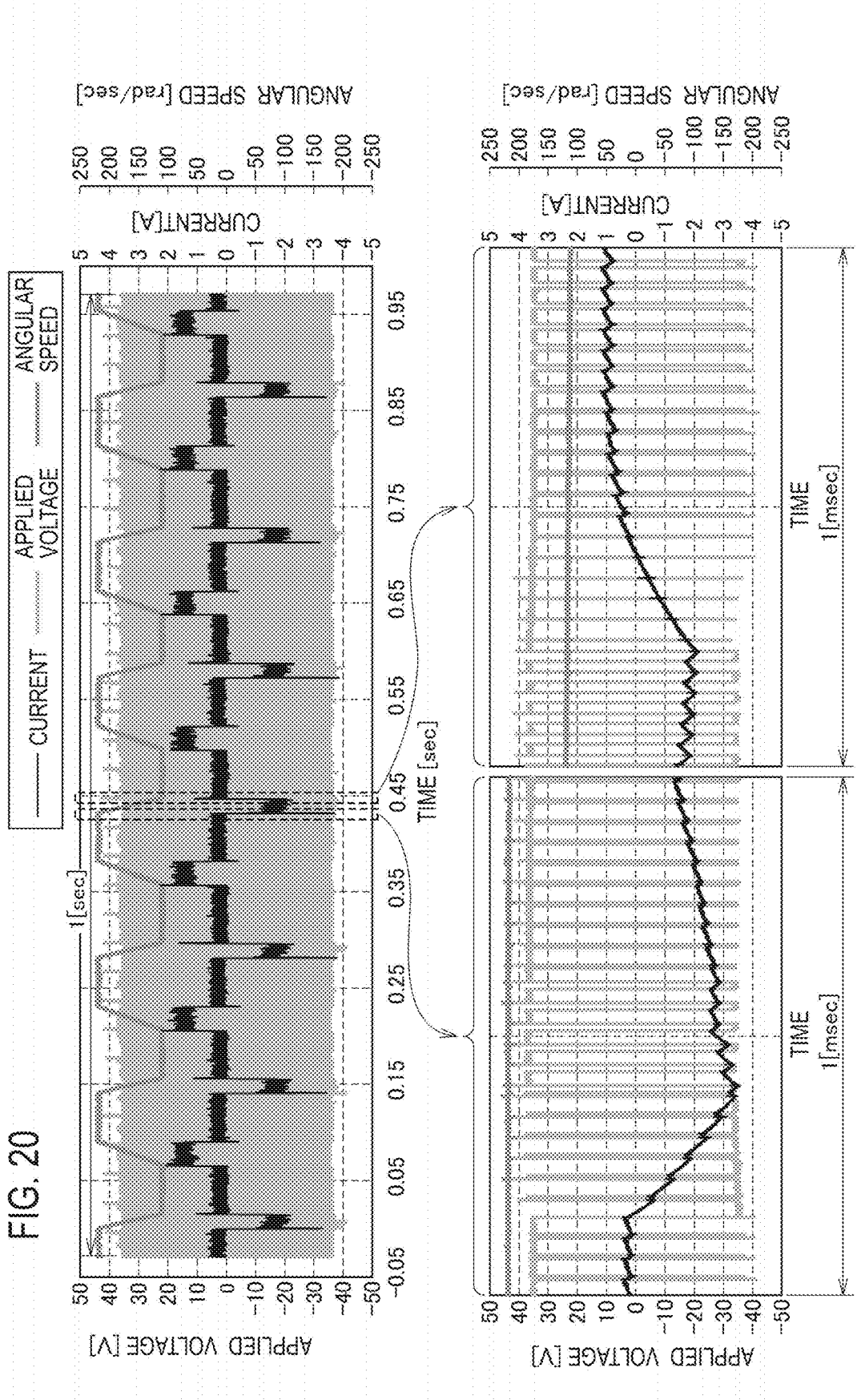
FIG. 20 includes a waveform diagram of measured data of the applied voltage, the current, and the angular speed of the motor in the drive pattern C, and enlarged views of waveforms in a period in which deceleration is started in transition from the high-speed forward rotation state to the low-speed forward rotation state and a period in which the deceleration is completed.

An upper section of FIG. 19 is a waveform diagram of the measured data of the applied voltage, the current Im, and the angular speed ωm of the motor 6 in the drive pattern C. A lower section of FIG. 19 includes enlarged views of waveforms in a period in which acceleration is started in transition from the low-speed forward rotation state to the high-speed forward rotation state and a period in which the acceleration is completed. An upper section of FIG. 20 is a waveform, diagram similar to the upper section of FIG. 19. A lower section of FIG. 20 includes enlarged views of waveforms in a period in which deceleration is started in transition from the high-speed forward rotation state to the low-speed forward rotation state and a period in which the deceleration is completed.

Figure 21:
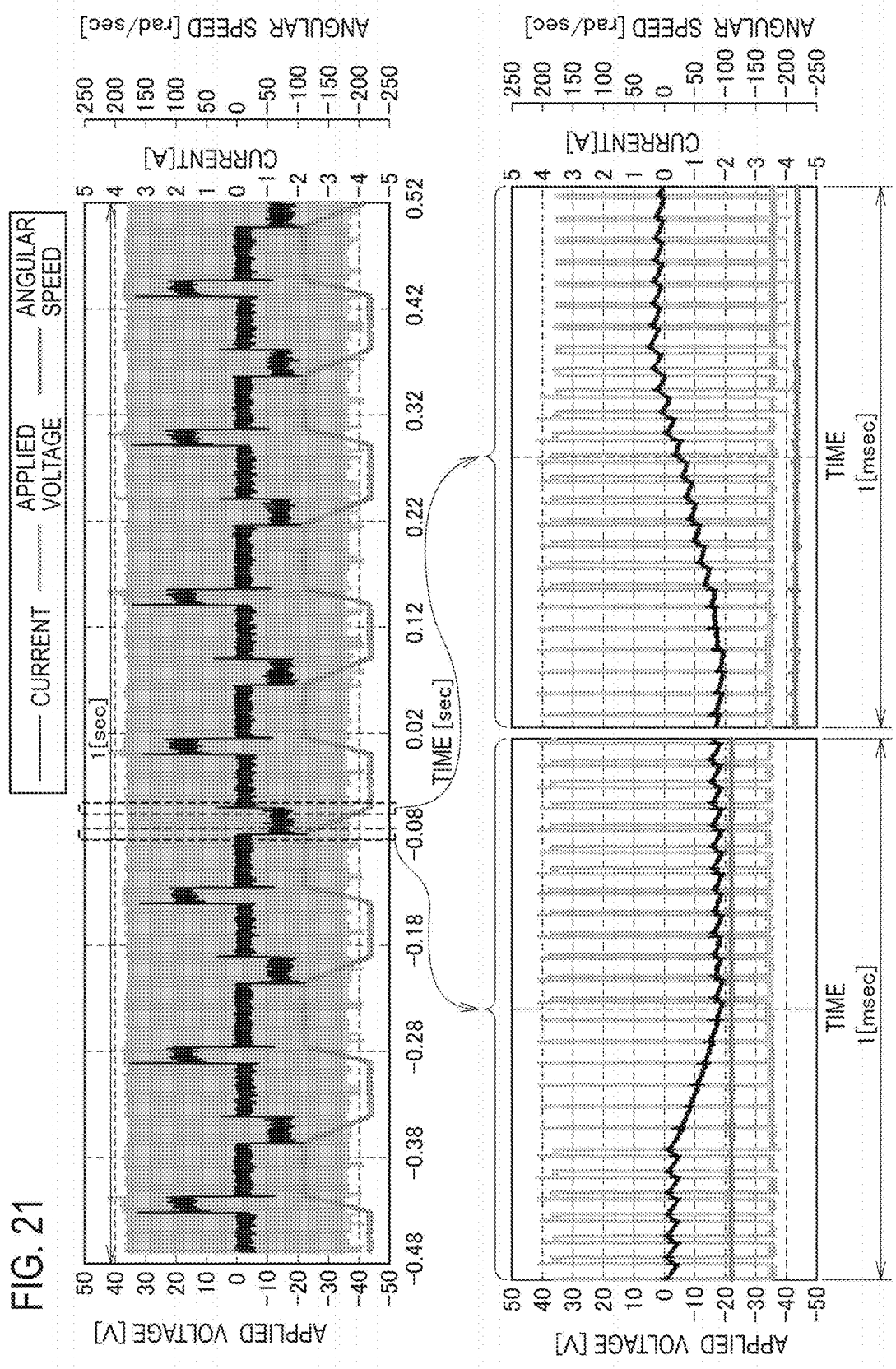
FIG. 21 includes a waveform diagram of measured data of the applied voltage, the current, and the angular speed of the motor in a drive pattern D, and enlarged views of waveforms in a period in which acceleration is started in transition from a low-speed reverse rotation state to a high-speed reverse rotation state and a period in which the acceleration is completed.
Figure 22:
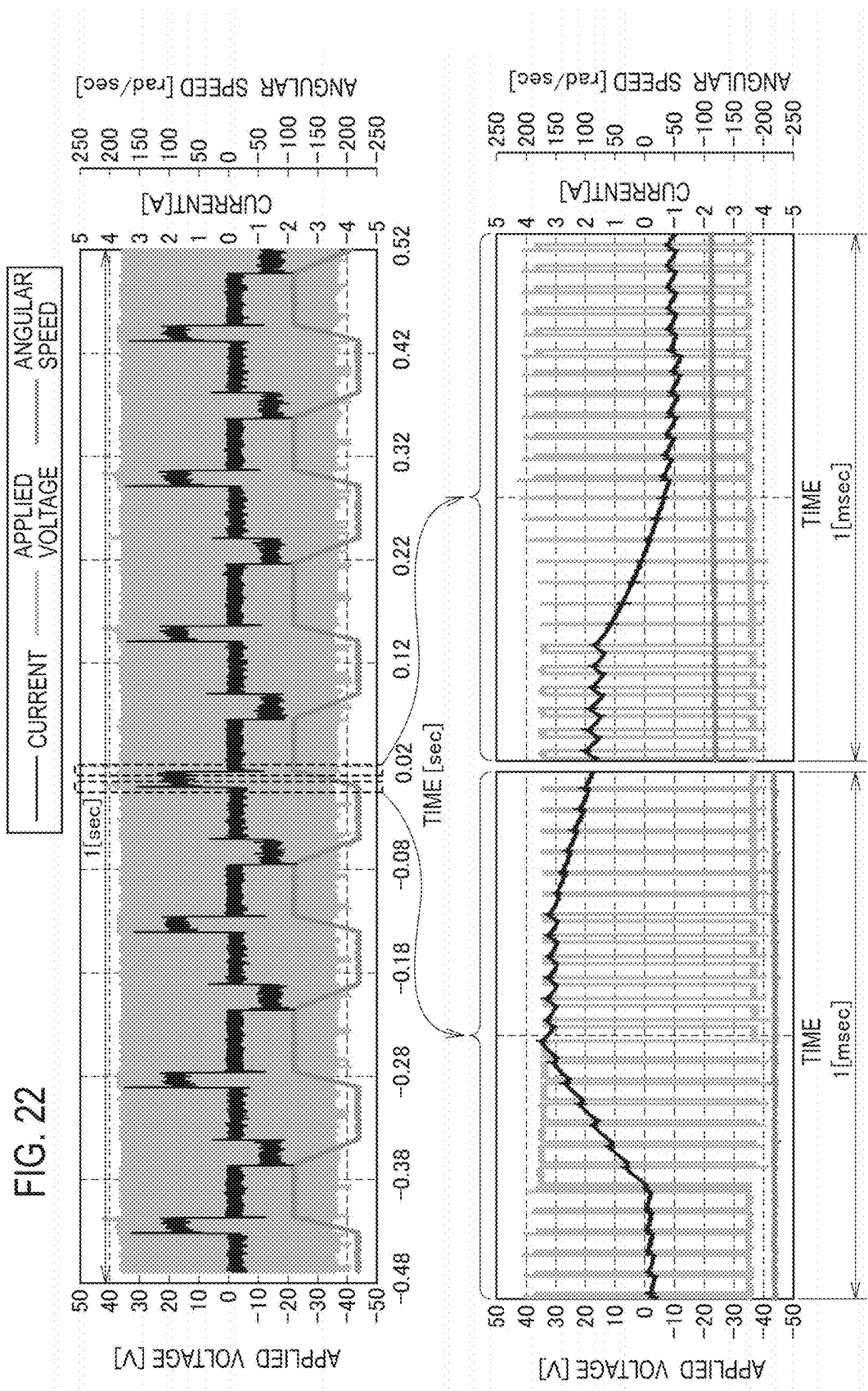
FIG. 22 includes a waveform diagram of measured data of the applied voltage, the current, and the angular speed of the motor in the drive pattern D, and enlarged views of waveforms in a period in which deceleration is started in transition from the high-speed reverse rotation state to the low-speed reverse rotation state and a period in which the deceleration is completed.
Figure 23:
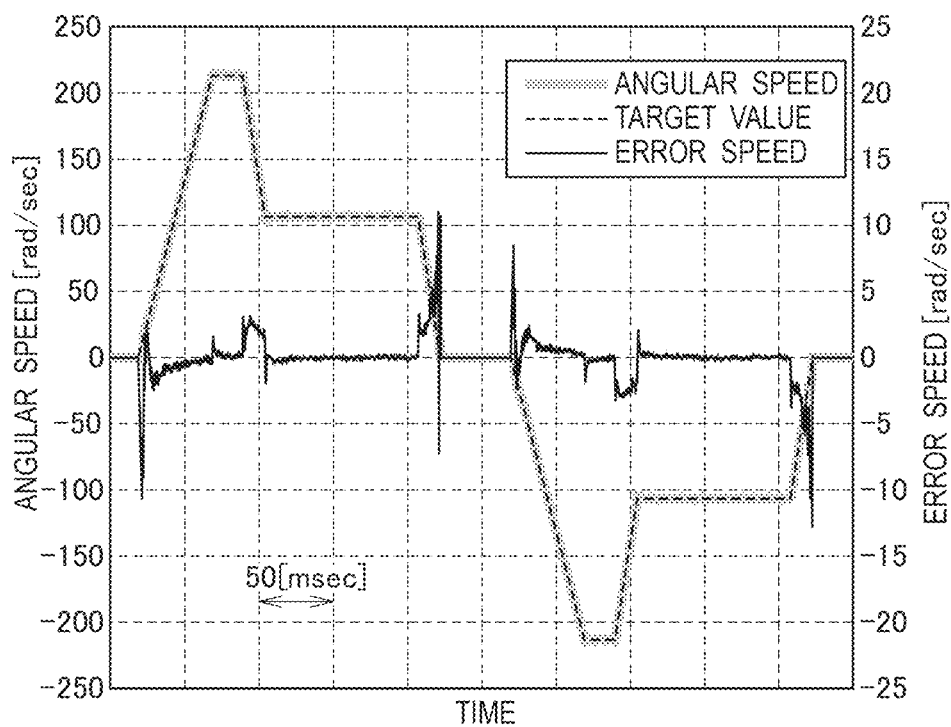
FIG. 23 is a graph depicting measured data of the angular speed and the error speed of the motor in the drive pattern A.
Figure 24:
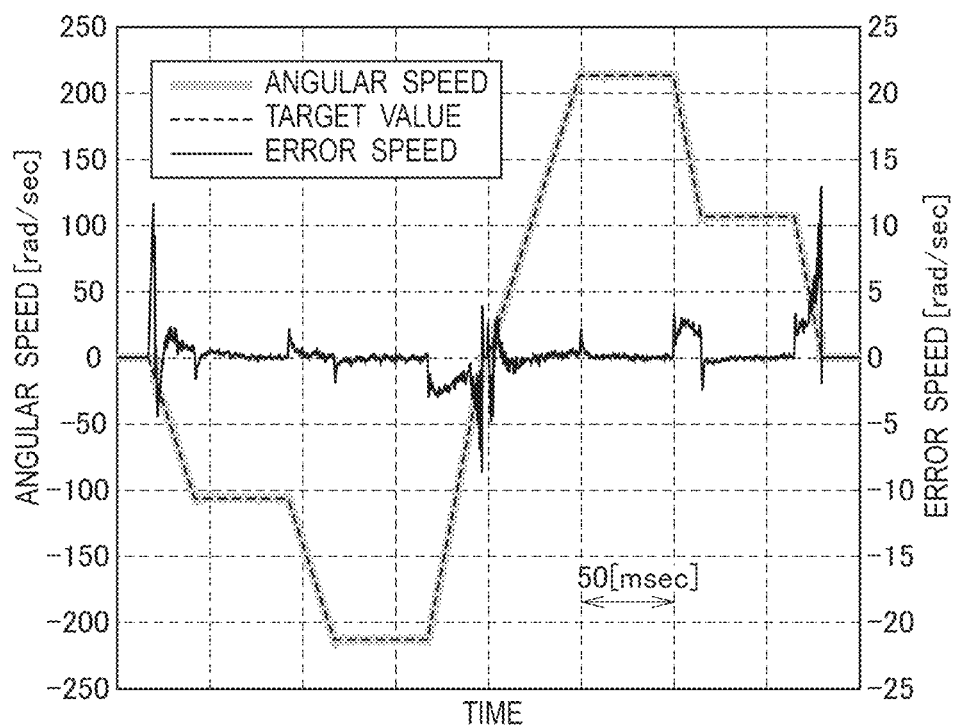
FIG. 24 is a graph depicting measured data of the angular speed and the error speed of the motor in the drive pattern B.
Figure 25:
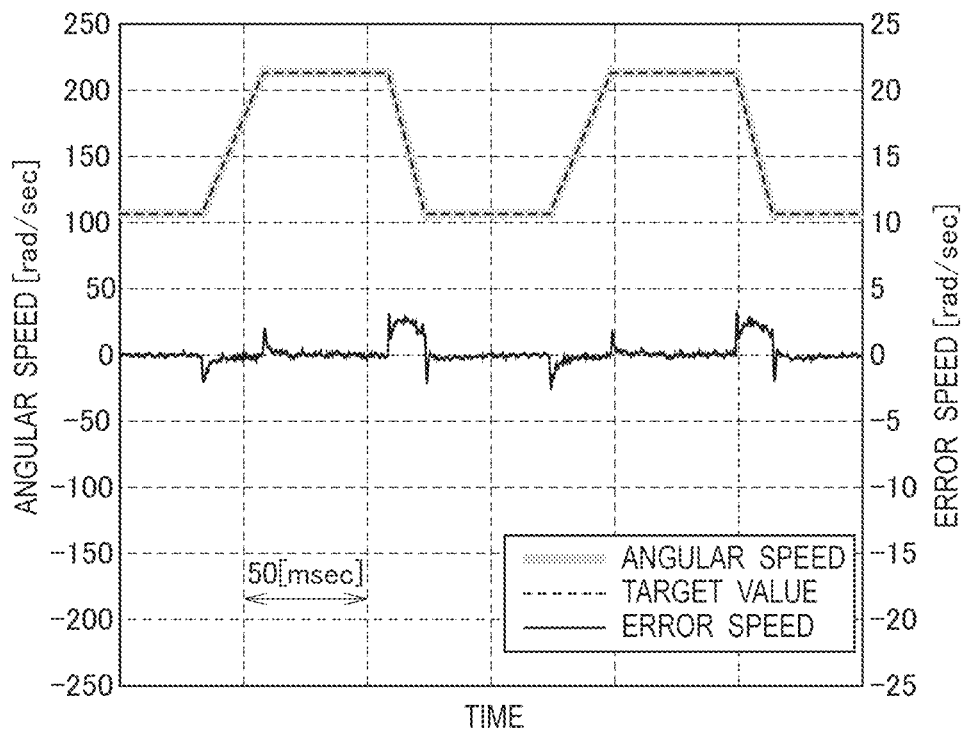
FIG. 25 is a graph depicting measured data of the angular speed and the error speed of the motor in the drive pattern C.
Figure 26:
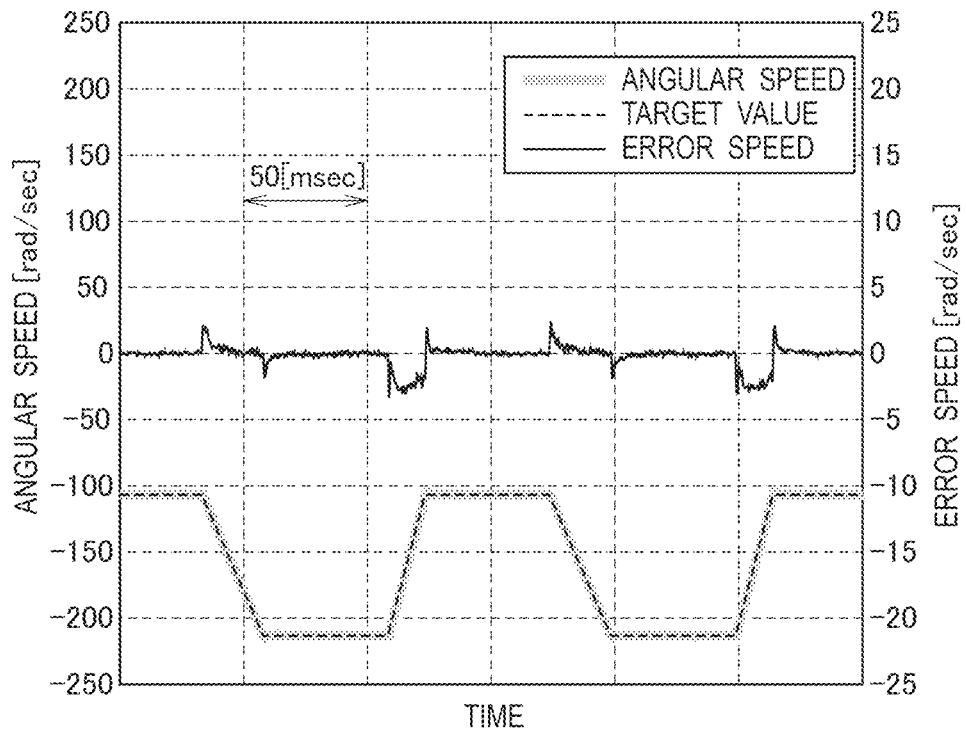
FIG. 26 is a graph depicting measured data of the angular speed and the error speed of the motor in the drive pattern D.

An upper section of FIG. 21 is a waveform diagram of the measured data of the applied voltage, the current Im, and the angular speed ωm of the motor 6 in the drive pattern D. A lower section of FIG. 21 includes enlarged views of waveforms in a period in which acceleration is started in transition from the low-speed reverse rotation state to the high-speed reverse rotation state and a period in which the acceleration is completed. An upper section of FIG. 22 is a waveform diagram similar to the upper section of FIG. 21. A lower section of FIG. 22 includes enlarged views of waveforms in a period in which deceleration is started in transition from the high-speed reverse rotation state to the low-speed reverse rotation state and a period in which the deceleration is completed.

As depicted in FIGS. 16 and 17, in the drive pattern A, transition to the temporary stop mode in the stop period lasting for the specified time or longer causes no ripple current to flow in the motor 6. In each of FIGS. 16 and 17, the left waveform diagram in the lower section is obtained by enlarging part of a first half of the portion surrounded by the broken line in the waveform diagram in the upper section. Meanwhile, the right waveform diagram in the lower section is obtained by enlarging part of a second half of the portion surrounded by the broken line in the waveform diagram in the upper section. In a period corresponding to the right waveform diagram in the lower section, the switching from the normal mode to the temporary stop mode is performed and no current flows in the motor 6.

In the drive pattern B, although there is timing at which the motor 6 stops in the instantaneous rotation direction reversal, this does not correspond to the stop period lasting for the specified time or longer. Accordingly, the PWM control of the synchronous rectification type in the normal mode is performed in the rotation direction reversal as depicted in FIG. 18. Note that the left waveform diagram and the right waveform diagram in the lower section of FIG. 18 are each obtained by enlarging part of the portion surrounded by the broken line in the waveform diagram in the upper section. The same applies to FIGS. 19 to 21.

In the drive patterns C, D, the motor 6 is not stopped, and the PWM control of the synchronous rectification type in the normal mode is performed as depicted in FIGS. 19 to 21.

Next, measured data of the angular speed ωm and the error speed ωe of the motor 6 in the drive patterns A to D is depicted in FIGS. 23 to 26. As depicted in FIGS. 23 to 26, a performance of high-speed response to the target speed command (target value ωr) which is performed in about 1 to several msec is obtained in all of the drive patterns A to D.

Next, evidence data on a performance of the drive control device 1 regarding the rotation speed control of the motor 6 is depicted in FIGS. 27 to 34.

Figure 27:
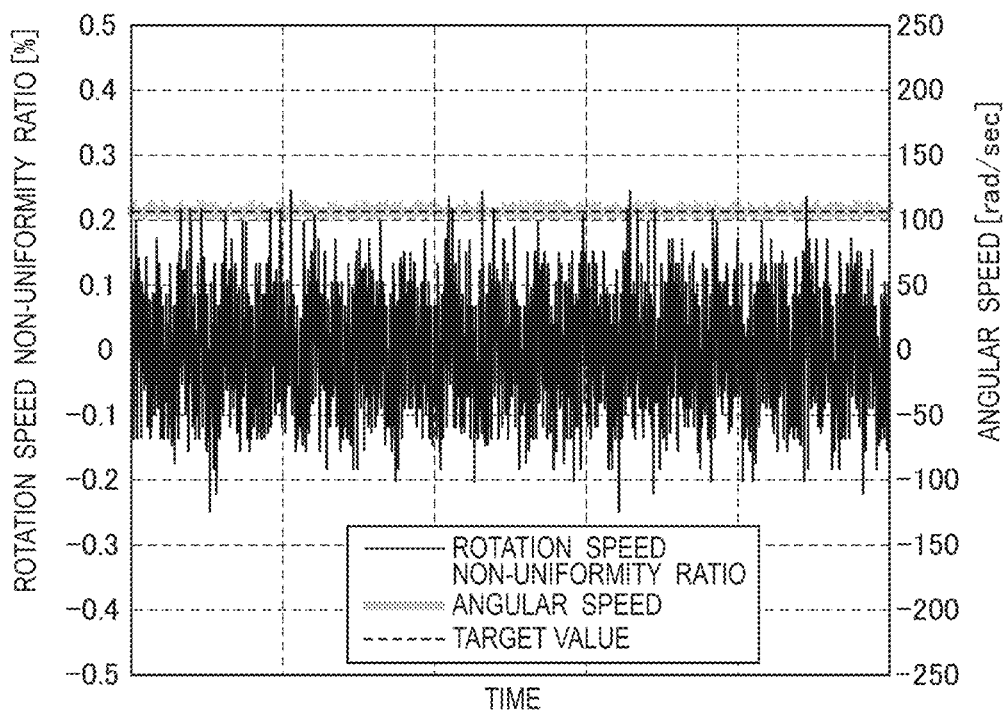
FIG. 27 is a graph depicting an example of measured data of a rotation speed non-uniformity ratio in the forward rotation.
Figure 28:
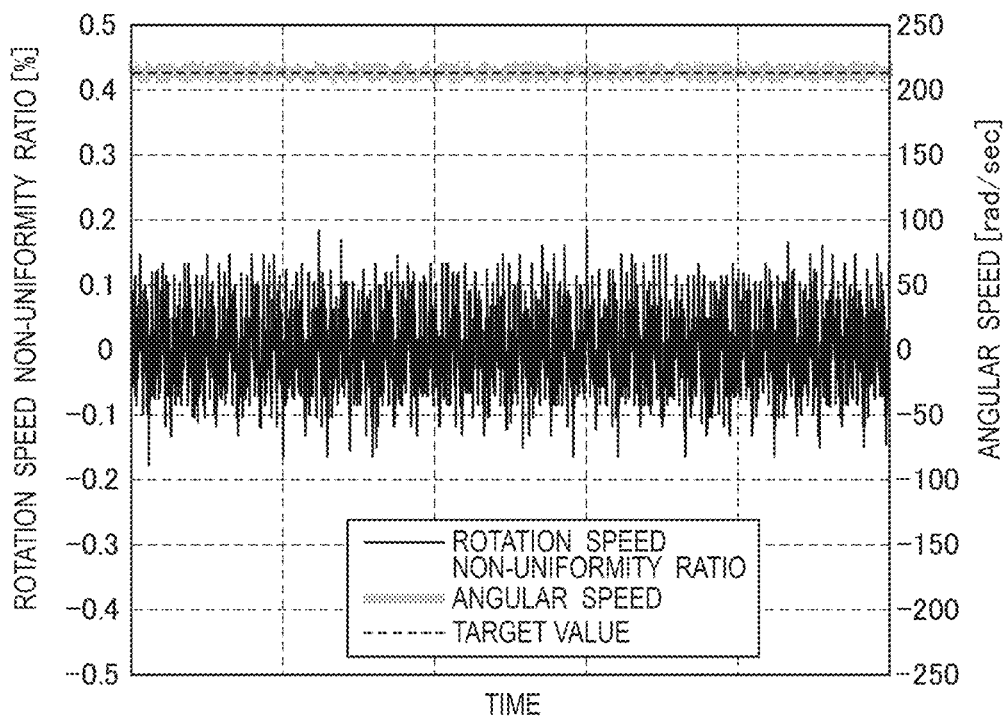
FIG. 28 is a graph depicting another example of the measured data of the rotation speed non-uniformity ratio in the forward rotation.
Figure 29:
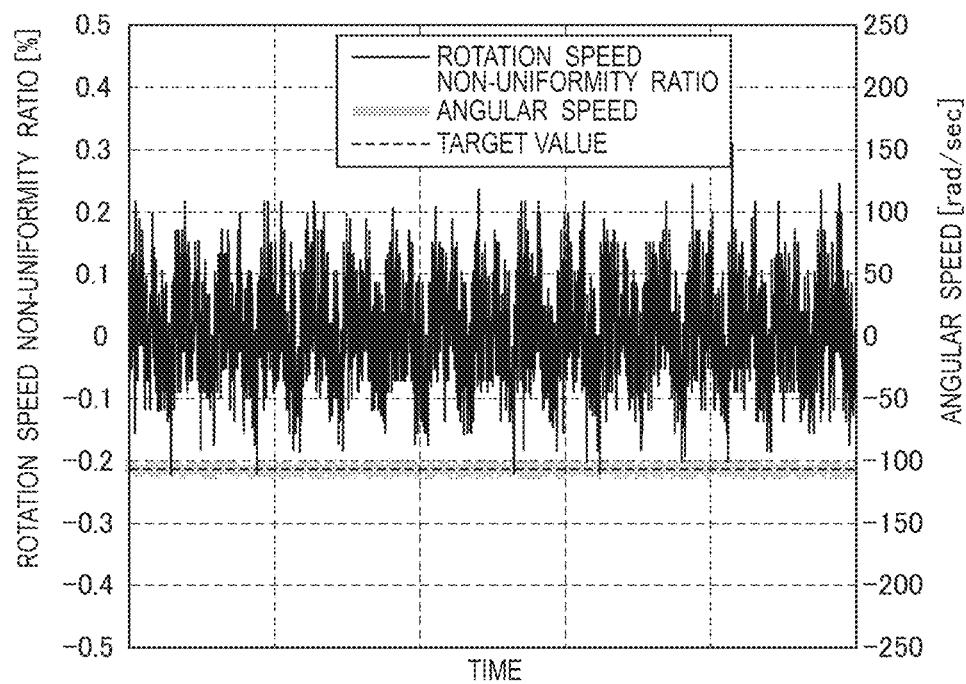
FIG. 29 is a graph depicting an example of the measured data of the rotation speed non-uniformity ratio in the reverse rotation.
Figure 30:
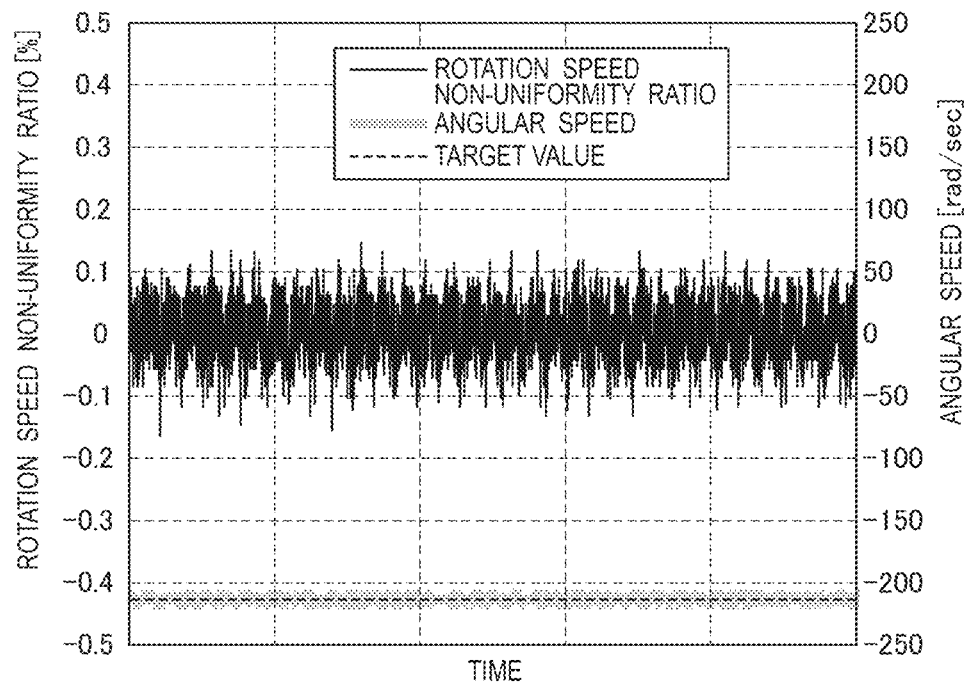
FIG. 30 is a graph depicting another example of the measured data of the rotation speed non-uniformity ratio in the reverse rotation.

FIGS. 27 and 28 are measured data of rotation speed non-uniformity ratios Wow in rotation in the forward direction. FIGS. 27 and 28 are measured data of the rotation speed non-uniformity ratios Wow with respect to the target values ωr different from each other. FIGS. 29 and 30 are measured data of the rotation speed non-uniformity ratios Wow in rotation in the reverse direction. FIGS. 29 and 30 are measured data of the rotation speed non-uniformity ratios Wow with respect to the target values ωr different from each other. FIGS. 31 to 34 are views depicting results obtained by performing FFT analysis on the rotation, speed non-uniformity ratios Wow of FIGS. 27 to 30, respectively.

In this case, each of the rotation speed non-uniformity ratios Wow [%] is expressed by the following formula (15).

$$\text{Wow} = (\omega m - \omega r) \cdot 100 / \omega r \ldots \qquad (15).$$

Figure 31:
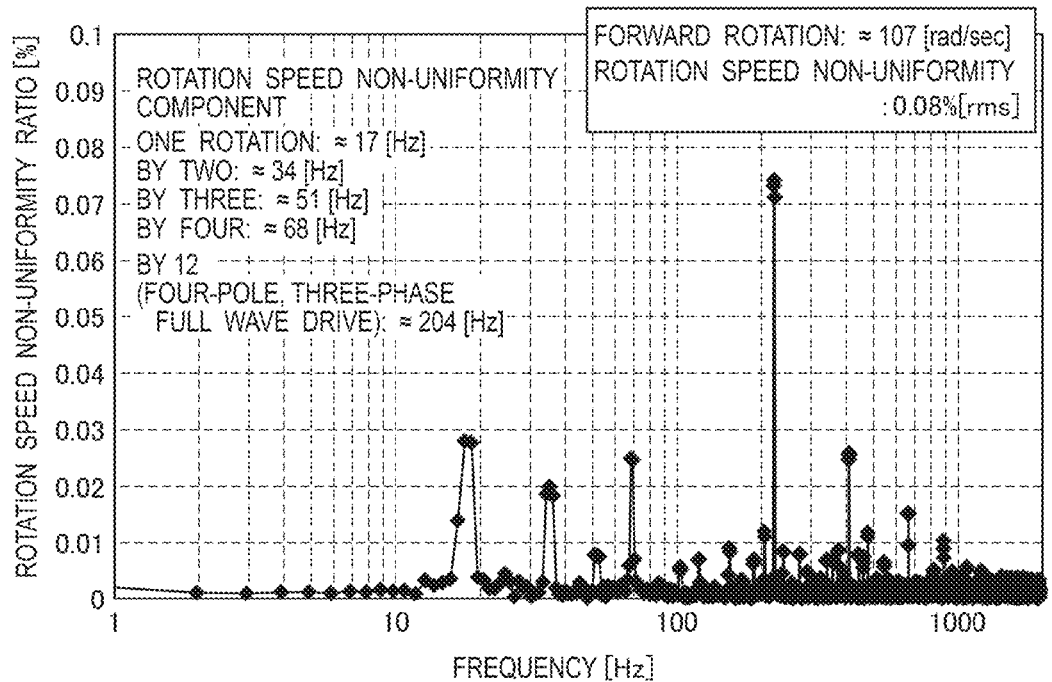
FIG. 31 is a graph illustrating a result obtained by performing FFT analysis on the rotation speed non-uniformity ratio of FIG. 27.
Figure 32:
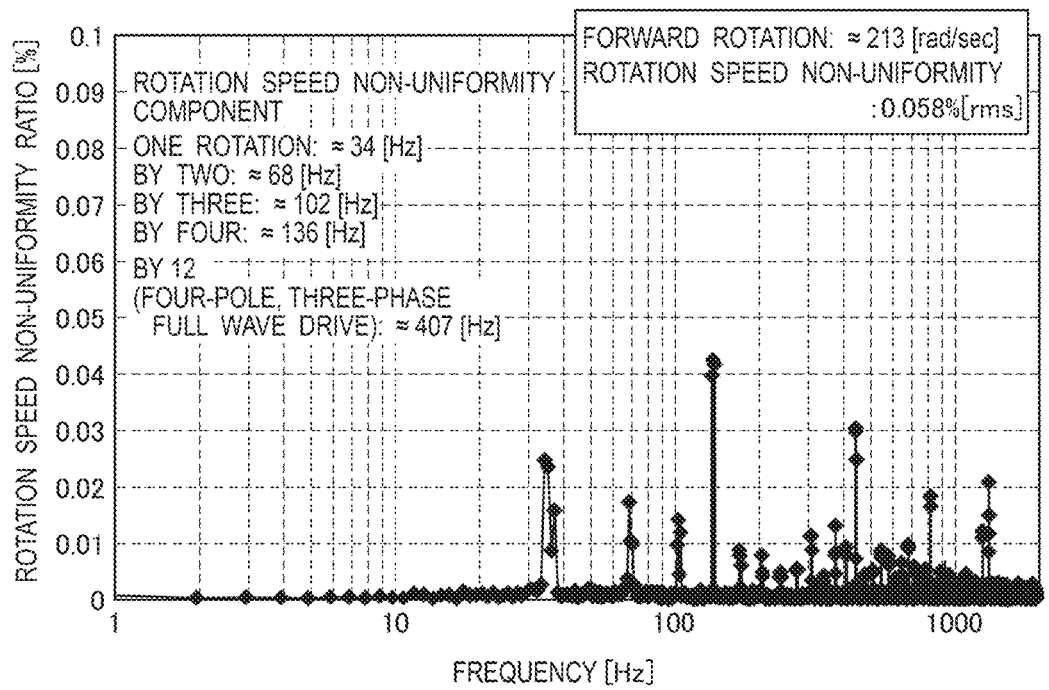
FIG. 32 is a graph illustrating a result obtained by performing the FFT analysis on the rotation speed non-uniformity ratio of FIG. 28.

As illustrated in FIGS. 31 and 34, it is confirmed that the rotation speed non-uniformity ratio Wow is equal to or less than 0.1% [rms] in both of the forward rotation and the reverse rotation when the angular speed ωm is equal to or greater than 100 rad/sec. As described above, in the drive control device 1, a highly-accurate rotation speed control performance is obtained.

As described above, in the drive control device 1, the embedded microcomputer 2 suspends the PWM control of the synchronous rectification type in the stop period lasting for the specified time or longer during the driving of the motor and controls the driver 3 such that the motor 6 is set to the short-circuit brake state or the disconnected state. This can prevent the ripple current from flowing in the stop period of the motor 6. As a result, the power loss and the temperature increase of the motor 6 can be suppressed.

Note that, although the drive control device 1 configured to perform, the PWM control of the synchronous rectification type in a circuit (H bridge circuit) supplied with power from a single power supply is described in the aforementioned embodiment, the present invention can be applied to a configuration in which the PWM control of the synchronous rectification type is performed in a circuit supplied with power from both of positive and negative power supplies.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A drive control device, comprising
    a driver including a circuit and configured to drive a motor; and
    a controller configured to control the driver,
    wherein the controller is configured to:
        determine whether a stop period lasts for a specified time or longer based on a preset drive schedule of the motor, the preset drive schedule including the stop period lasting for the specified time or longer and drive periods before and after the stop period lasting for the specified time or longer,
        in a period other than the stop period lasting for the specified time or longer in the preset drive schedule, control the driver by a pulse width modulation control of a synchronous rectification type, and
        in the stop period lasting for the specified time or longer in the preset drive schedule, suspend the pulse width modulation control of the synchronous rectification type and control the driver such that the motor is set to one of a short-circuit brake state or a disconnected state.

2. The drive control device according to independent claim 1, wherein
    the controller includes:
        a pulse width modulation generator; and
        a speed setter that outputs a pulse width modulation control mode command to the pulse width modulation generator for performing a switching between a normal mode and a temporary stop mode, the normal mode being a mode in which the pulse width modulation control of the synchronous rectification type is performed, the temporary stop mode being a mode in which the pulse width modulation control of the synchronous rectification type is suspended in the stop period lasting for the specified time or longer in the preset drive schedule.

3. The drive control device according to claim 2, wherein
    when the stop period lasts for the specified time or longer in the preset drive schedule, the speed setter instructs the pulse width modulation generator to perform the switching from the normal mode to the temporary stop mode via the pulse width modulation control mode command, and
    when the pulse width modulation control mode command is received by the pulse width modulation generator, the pulse width modulation generator performs the switching to the temporary stop mode, and communicates with the driver to set the motor to the one of the short-circuit brake state or the disconnected state such that the motor is set to a state where no current flows therein.

4. The drive control device according to claim 2, wherein
    when the stop period lasting for the specified time or longer ends, the speed setter instructs the pulse width modulation generator to return from the temporary stop mode to the normal mode via the pulse width modulation control mode command such that the drive control device returns to the pulse width modulation control of the synchronous rectification type.

5. The drive control device according to claim 2, wherein the driver includes:
    an H-bridge circuit including a first set of switch elements and a second set of switch elements; and
    a predriver that connects the pulse width modulation generator to the first set of switch elements of the H-bridge circuit, wherein
    when the motor is in the short-circuit brake state, a first switch element of each of the first set of switch elements and the second set of switch elements is set to ON, and a second switch element of each of the first set of switch elements and the second set of switch elements is set to OFF, and
    when the motor is in the disconnected state both the first set of switch elements and the second set of switch elements are set to OFF.

6. The drive control device according to independent claim 1, wherein
    the one of the short-circuit brake state or the disconnected state is a state in which current flow to the motor is stopped.

7. The drive control device according to independent claim 1, wherein
    in the stop period, the pulse width modulation control of the synchronous rectification type is suspended such that that generation of voltage applied to the motor is stopped.

* * * * *